US008955853B1

(12) United States Patent
Perkins et al.

(10) Patent No.: US 8,955,853 B1
(45) Date of Patent: Feb. 17, 2015

(54) HEAVY DUTY SINGLE LANE TRAILER SYSTEM

(75) Inventors: Neil Perkins, Northfield, MN (US);
John Ehr, Farmington, MN (US)

(73) Assignee: Perkins Motor Transport, Inc., Northfield, MN (US)

( * ) Notice: Subject to any disclaimer, the term of this patent is extended or adjusted under 35 U.S.C. 154(b) by 188 days.

(21) Appl. No.: 13/342,830

(22) Filed: Jan. 3, 2012

Related U.S. Application Data

(60) Provisional application No. 61/429,185, filed on Jan. 3, 2011.

(51) Int. Cl.
*B60G 17/00* (2006.01)
*B60P 1/00* (2006.01)

(52) U.S. Cl.
USPC ........................................ 280/6.159; 280/789

(58) Field of Classification Search
USPC .............. 280/419, 442, 443, 444, 789, 6.159, 280/91.1, 93.502; 180/22, 24.02, 24.03, 180/24.13, 91.1, 93.502
See application file for complete search history.

(56) References Cited

U.S. PATENT DOCUMENTS

| | | | |
|---|---|---|---|
| 3,414,294 A | 12/1968 | Mouton | |
| 3,649,046 A | 3/1972 | Mathisen | |
| 3,866,935 A * | 2/1975 | Nelson | ........................ 280/43.23 |
| 4,486,029 A | 12/1984 | Raidel | |
| 4,741,549 A | 5/1988 | Gevers | |
| 4,943,078 A | 7/1990 | McGhie et al. | |
| 5,152,545 A | 10/1992 | Hupperts et al. | |
| 5,240,273 A | 8/1993 | Stead et al. | |
| 5,375,866 A | 12/1994 | Wagner | |
| 6,203,045 B1 | 3/2001 | Kyrtsos et al. | |
| 6,270,168 B1 | 8/2001 | McCann | |
| 6,273,522 B1 | 8/2001 | Feetenby et al. | |
| 6,311,954 B1 | 11/2001 | Breslin et al. | |
| 6,345,943 B1 | 2/2002 | Lawson et al. | |
| 6,543,857 B1 | 4/2003 | Griffiths et al. | |
| 6,679,511 B2 | 1/2004 | Parker et al. | |
| 6,692,218 B2 | 2/2004 | Grile | |
| 6,796,572 B1 | 9/2004 | McGhie et al. | |
| 6,942,232 B1 | 9/2005 | McGhie et al. | |
| 6,957,822 B2 | 10/2005 | Douglas et al. | |
| 7,011,329 B2 | 3/2006 | Yoder | |
| 7,131,652 B2 | 11/2006 | Ramsey | |
| 7,134,829 B2 | 11/2006 | Quenzi et al. | |
| 7,159,888 B1 | 1/2007 | Sutton et al. | |
| 7,188,680 B2 | 3/2007 | Almen | |

(Continued)

FOREIGN PATENT DOCUMENTS

DE 2130420 12/2009
EP WO2009112447 9/2009

(Continued)

*Primary Examiner* — Paul N Dickson
*Assistant Examiner* — Joselynn Y Sliteris
(74) *Attorney, Agent, or Firm* — Dietz Law Office LLC

(57) ABSTRACT

An apparatus is described capable of use on smooth and rough terrains at both low and high speeds. The trailer apparatus has an auto leveling feature combined with uniform loading support that reduces torsional loading of the cargo. The invention also includes a trailer capable of travel at high speeds, which hydraulically equalizes distribution of the weight of the cargo. The invention further includes an easy lift tow bar, all axle steering, single tire axles, self-leveling and adjustable suspension, combination of air, anti-lock and electronic braking system, and ability to travel at high speed speeds with reduced system sway.

20 Claims, 28 Drawing Sheets

(56) References Cited

U.S. PATENT DOCUMENTS

| | | |
|---|---|---|
| 7,213,824 B1 | 5/2007 | McGhie et al. |
| 7,216,896 B1 | 5/2007 | McGhie et al. |
| 7,448,839 B2 | 11/2008 | Grile |
| 7,506,685 B2 | 3/2009 | Zubrin et al. |
| 7,540,522 B2 | 6/2009 | Friggstad |
| 7,562,887 B1 | 7/2009 | Sutton et al. |
| 7,686,320 B1 | 3/2010 | McGhie et al. |
| 7,690,660 B2 | 4/2010 | Dudding et al. |
| 7,784,879 B2 * | 8/2010 | Koelzer ............ 303/3 |
| 7,878,516 B2 | 2/2011 | Gottschalk et al. |
| 2003/0085562 A1 | 5/2003 | Sparling |
| 2007/0108731 A1 | 5/2007 | McBroom |
| 2008/0315558 A1 | 12/2008 | Cesternino |
| 2009/0273159 A1 | 11/2009 | Sutton |
| 2010/0168977 A1 | 7/2010 | Matsuno |

FOREIGN PATENT DOCUMENTS

| | | |
|---|---|---|
| EP | 2243688 | 10/2010 |
| GB | 1479024 | 7/1977 |
| NL | 0788902 | 8/1997 |

* cited by examiner

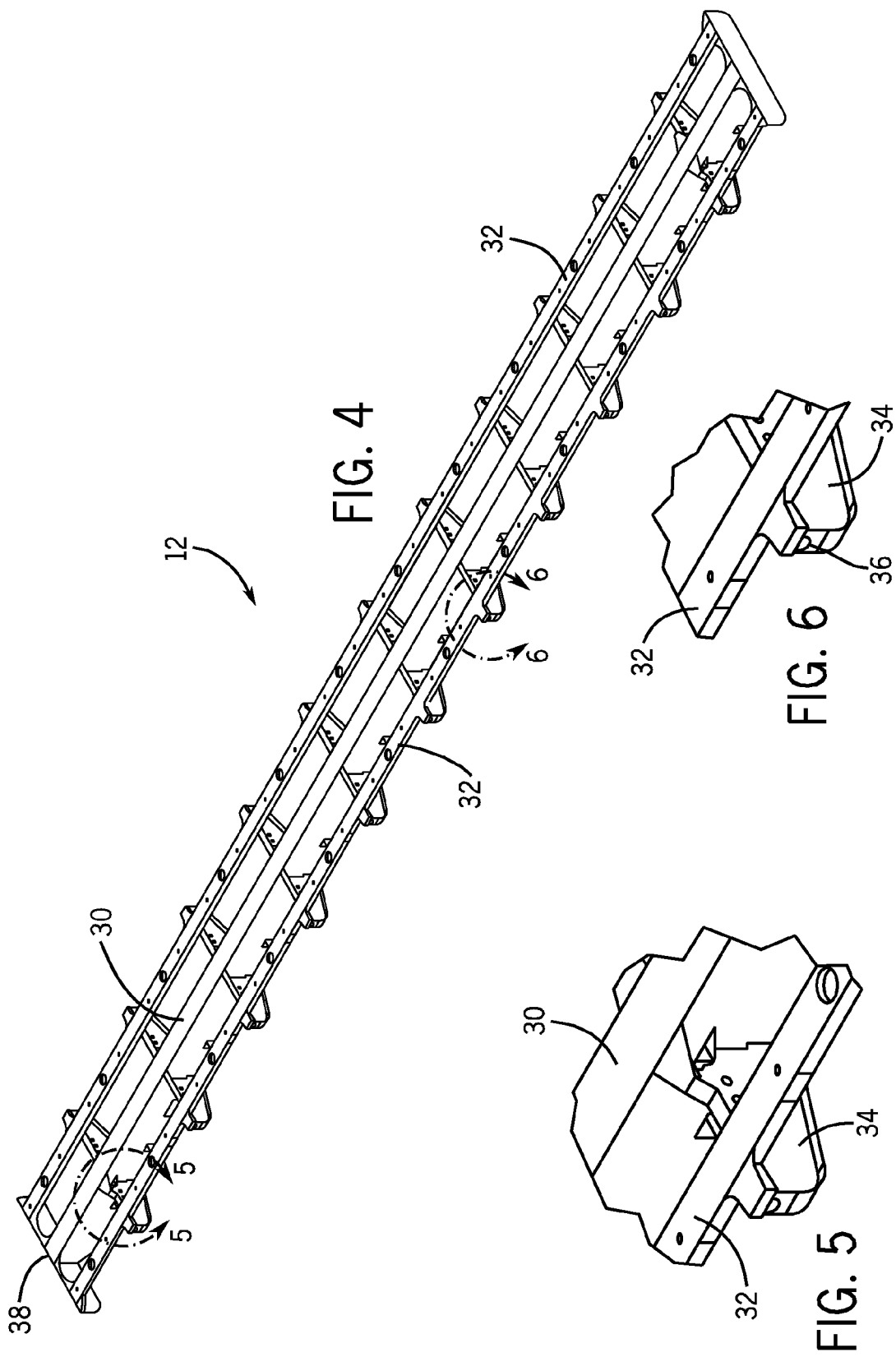

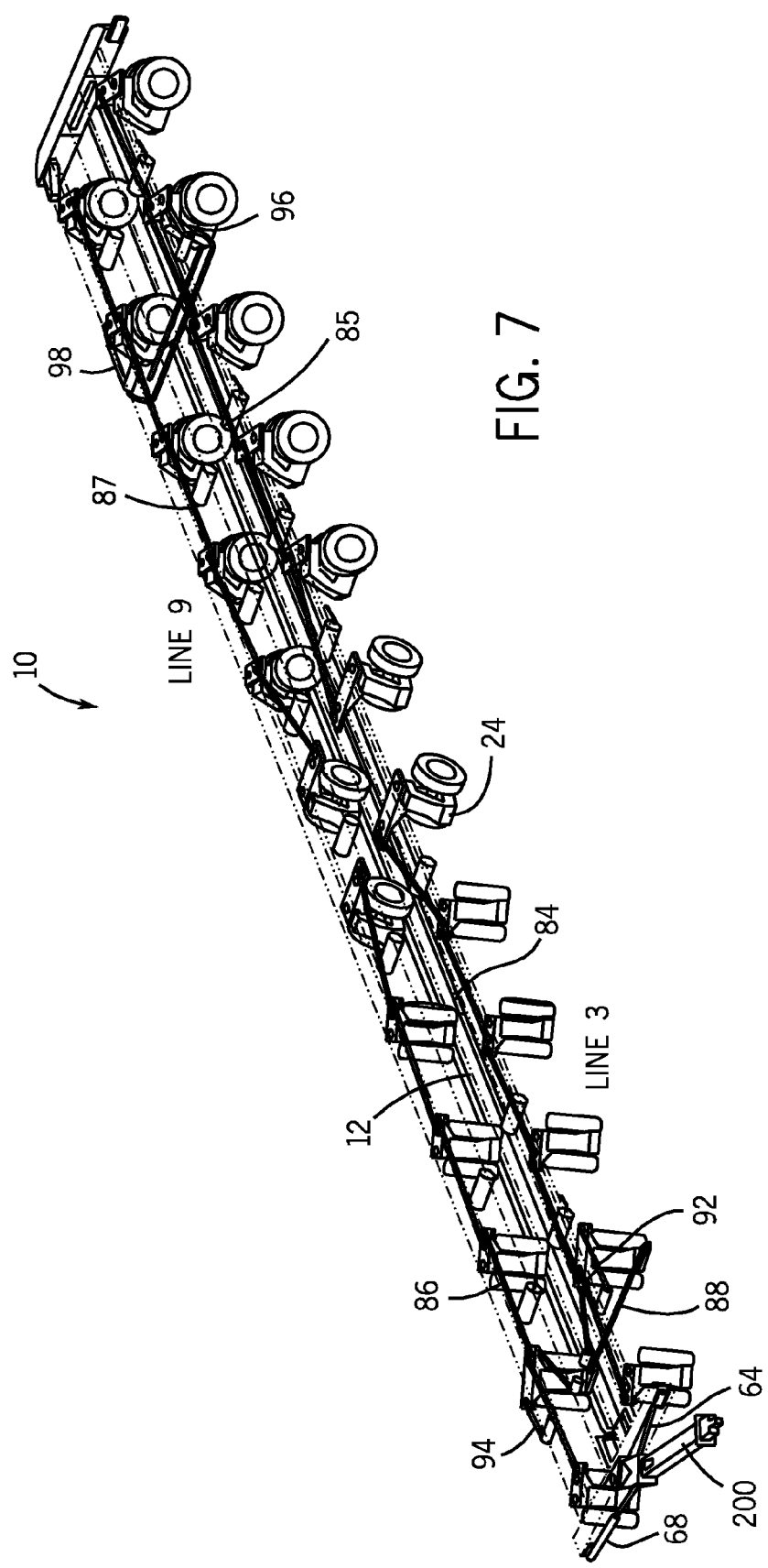

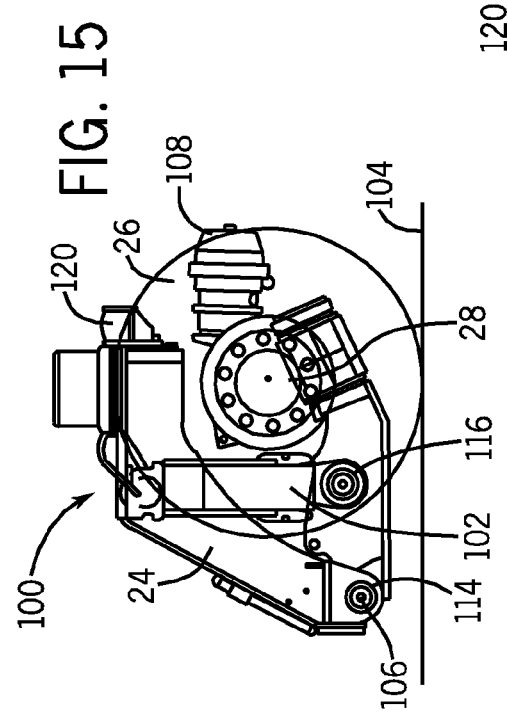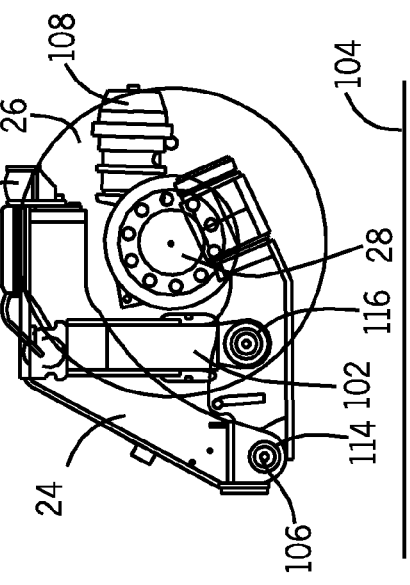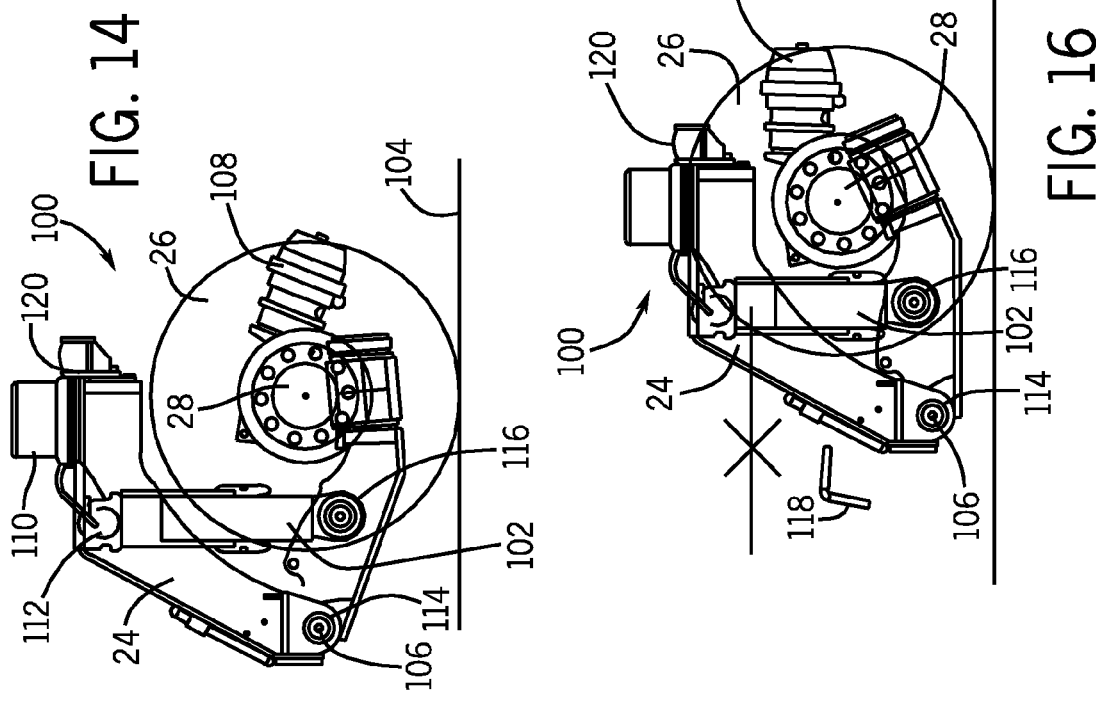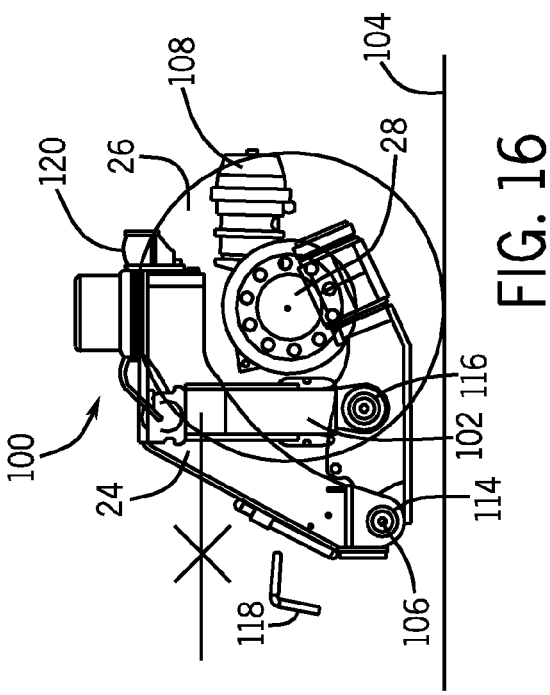

| | MENU | FUNCTION | SIGNAL | PUMP SIGNAL |
|---|---|---|---|---|
| 1 | STEERING | L/R MAIN STEERING | STEERING | PUMP |
| 2 | SUSPENSION | U/D ALL SUSP | 1/2, 3/4, 5/6 | 17/18 |
| 3 | SUSPENSION FRONT REAR | U/FRONT U/REAR L + R | 5/5, 1/2, 3/4 | 17/18 |
| 4 | SUSPENSION LEFT RIGHT | U/D REAR L U/D REAR R | 1/2, 3/4 | 17/18 |
| 5 | ADDITIONAL FUNCTION | ADD. FUNCTION | 7/8 | PUMP |
| 6 | REAR STEERING ALIGNMENT ONLY! | L/R REAR STEERING | 9/10 | PUMP |

| FUNCTION | CONNECTION | PUMP SIGNAL |
|---|---|---|
| MAIN STEERING | STEERING | PUMP |
| REAR STEERING | 9/10 | PUMP |
| SUSPENSION REAR (L+R) | 1/2 + 3/4 | 17/18 |
| SUSPENSION FRONT | 5/6 | 17/18 |
| ADDITIONAL FUNCTION | 7/8 | PUMP |

FIG. 31

HEAVY DUTY SINGLE LANE TRAILER SYSTEM

CROSS-REFERENCE TO RELATED APPLICATIONS

This application claims the filing benefit and priority of U.S. Provisional Application Ser. No. 61/429,185 filed Jan. 3, 2011, the contents which are incorporated herein by reference in its entirety.

FEDERAL SPONSORSHIP

Not Applicable

JOINT RESEARCH AGREEMENT

Not Applicable

TECHNICAL FIELD

This invention pertains generally to trailers suitable for use in both off-highway and single lane, highway travel. This invention also pertains to heavy agricultural implements and oversize trailers suitable for on and off highway use to transport overweight and over dimensional loads at low or high speeds.

BACKGROUND

Generally, trailers for hauling oversize, overweight, and over length loads have previously been described. These heavy loads may include, for example, cranes, concrete structures, construction equipment, construction materials, oversized vehicles or the like. Often, it is desirable for these heavy haul trailers to provide some level of support under the cargo, for example throughout the length of the cargo, to help reduce the torsional and related forces the cargo may be subjected to during transport. Also, cargo manufacturers may require some level of support under the cargo and/or throughout the length of the cargo to help reduce the torsional and related forces the cargo may be subjected to during transport. Further, sloped and uneven roads may cause additional stress on the cargo during transport. Prior trailers capable of transporting massive or heavy loads typically include multiple axles. Many prior trailers have been designed exclusively for either use on highway roads or for low speed off highway use.

By way of example, prior devices have included a long platform with multiple rows of axle suspension assemblies arranged close together under the platform to support a load on the platform. These prior trailer's longitudinal axle spacing are close to avoid damage to the platform from the weight of the cargo, however, this close spacing of the axles reduces the applicable payload capacity of the trailer. These systems also typically include suspensions that, when travelling at high speeds, result in trailer sway or other instability. Prior trailers have also allowed for the addition or subtraction of axle lines, however, this ability to add or subtract an axle results in inconsistent axle geometries and system sway at higher speeds.

Hence, there is a need for a trailer system capable of use on smooth and rough terrains at both low and high speeds. There is also a need for a trailer that includes an auto leveling feature combined with uniform loading support that reduces torsional loading of the cargo. There is also a need for a trailer capable of travel at high speeds, which hydraulically equalizes distribution of the weight of the cargo in all hauling instances.

SUMMARY

Embodiments according to aspects of the invention include a trailer capable of use on smooth and rough terrains at both low and high speeds. Embodiments according to aspects of the invention also have an auto leveling feature combined with uniform loading support that reduces torsional loading of the cargo. Aspects of the invention also include a trailer capable of travel at high speeds, which hydraulically equalizes distribution of the weight of the cargo. Aspects of the invention further include an easy lift tow bar, all axle steering, single tire axles, self-leveling and adjustable suspension, combination of air, anti-lock and electronic braking system, and ability to travel at high speed speeds with reduced system sway.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various drawings, which are not necessarily drawn to scale, further description of the inventive aspects of the invention are included and described on the drawings which are incorporated by reference into the description of the invention. Like numerals throughout the figures identify substantially similar components.

FIG. 4. is a top perspective view of the carriage of the trailer of the present invention;

FIG. 5 is an enlarged partial sectional perspective view of a portion of an outrigger of the carriage of the type shown in FIG. 4;

FIG. 6 is an enlarged partial sectional perspective view of a portion of a mid-section outrigger of the carriage of the type shown in FIG. 4;

FIG. 7 is a top perspective view of the trailer in accordance with the present invention;

FIG. 14 is a side elevational view of the axle and suspension assembly of the present invention shown in contact with a travel surface and in a raised position;

FIG. 15 is a side elevational view of the axle and suspension assembly of the present invention shown in contact with a travel surface and in a lowered position;

FIG. 16 is a side elevational view of the axle and suspension assembly of the present invention shown in contact with a travel surface and in a lowered and locking position;

FIG. 17 is a side elevational view of the axle and suspension assembly of the present invention shown elevated above a travel surface and in a lowering position;

FIG. 31 is a diagram of features of the steering suspension control unit for the trailer of the present invention.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Prior trailer systems might include a tractor and a trader combination that include a front jeep (or trader), connection linkages from front to rear, and a rear dolly (or trailer) system along with provisions made at the front and rear trailers to reduce contact stresses to the cargo. The tractor may be connected either via a fifth wheel or a towing mechanism. These types of combinations introduce torsion and related forces into the load, take a long time to secure, and do not steer or perform in an optimum manner. In addition, overall steering and load equalization limitations also introduce other stresses into the loads. Prior platform trailers used for off-highway use are typically equipped with a tow mechanism, single axles, steering struts, and a reinforced platform that allows for placement of larger oversize loads on the jobsite or at other off-highway locations. Although this type of trailer is also often equipped with shorter axle spacing that allows for the addition or subtraction of axle lines, as noted above, these trailer configurations are susceptible to trailer sway at higher speeds.

Figure 1:
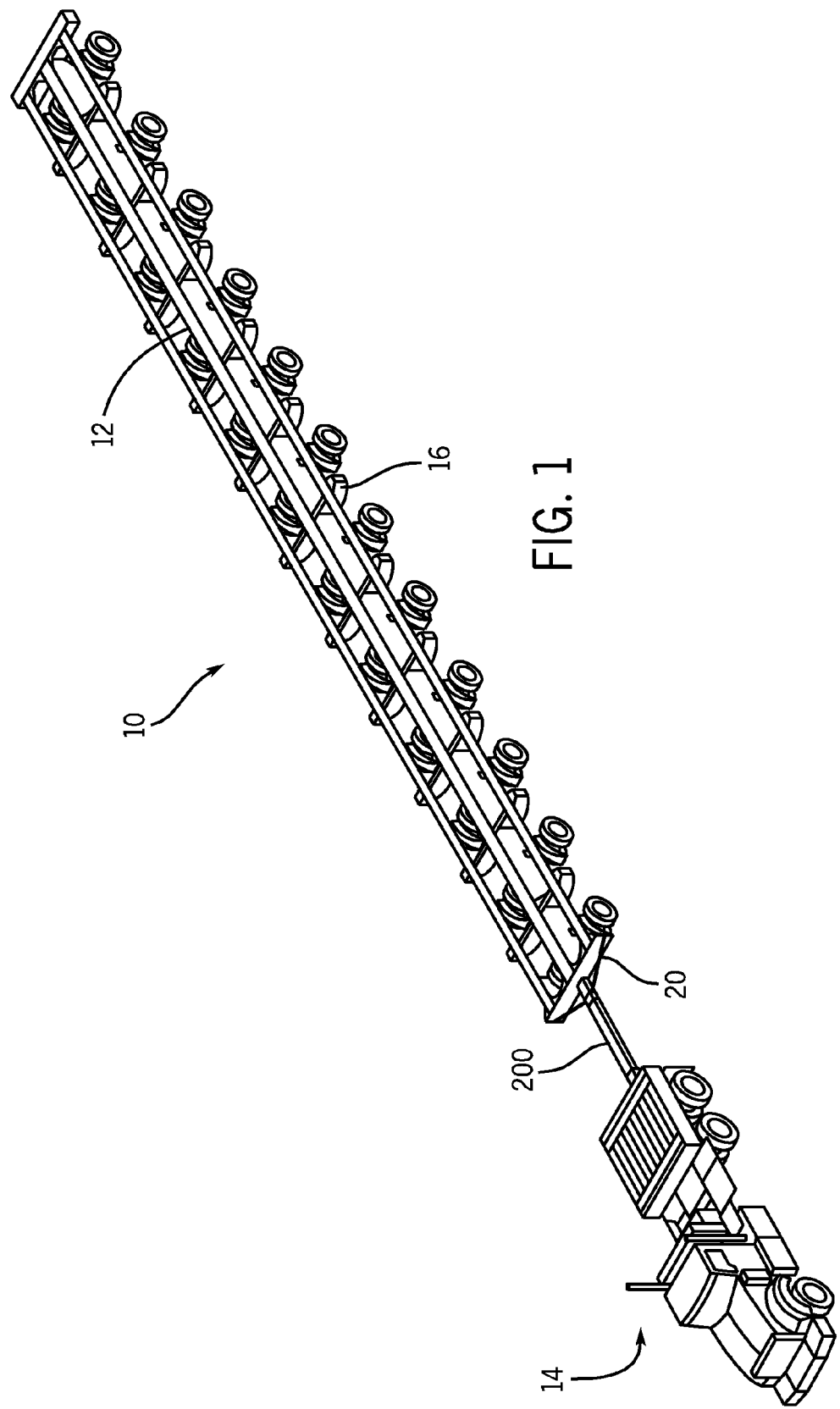
FIG. 1 is a top perspective view of a vehicle attached to a trailer in accordance with the present invention.
Figure 2:
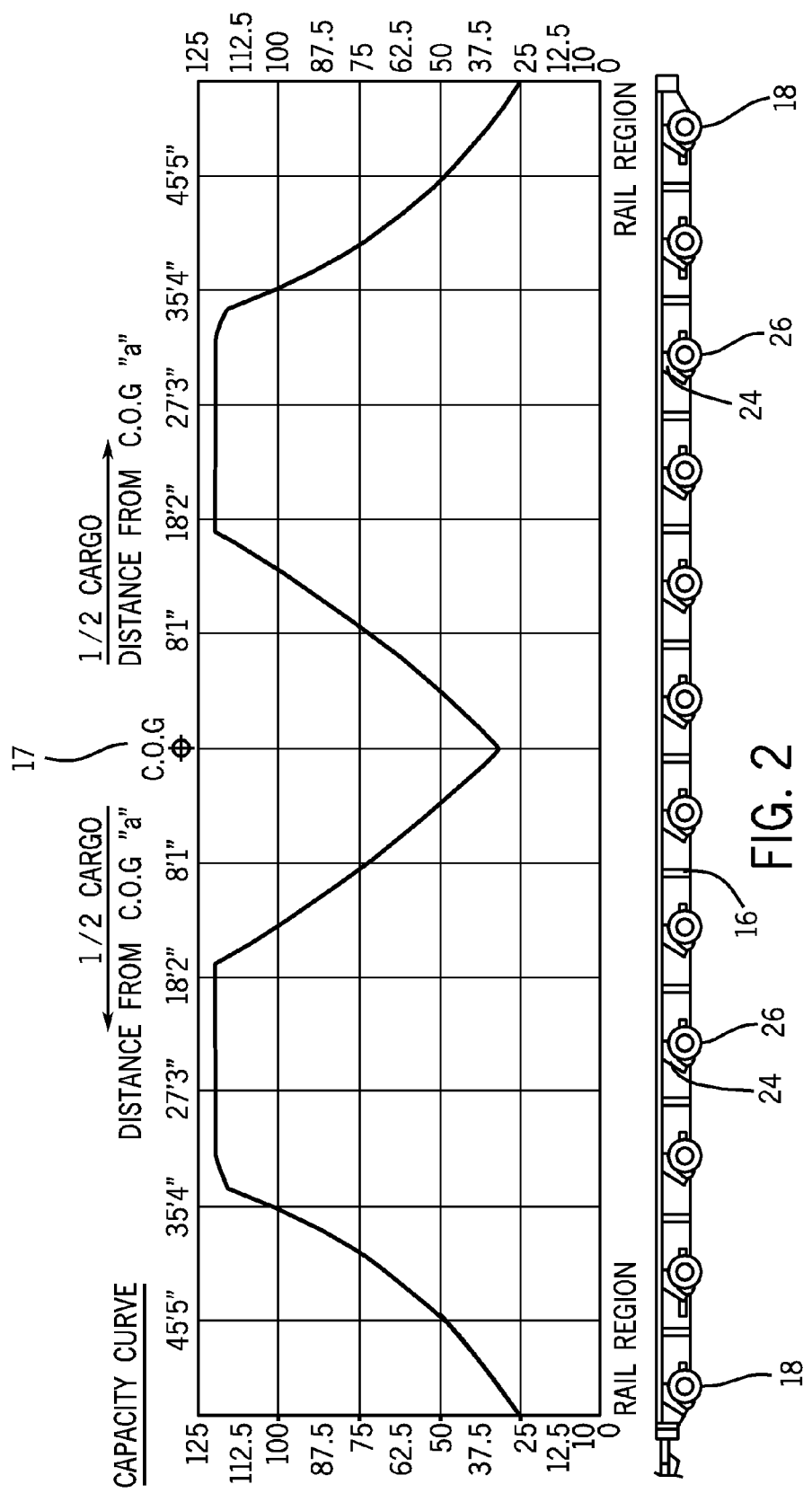
FIG. 2 depicts a capacity curve and related load bearing data for a trailer in accordance with the present invention.
Figure 3:
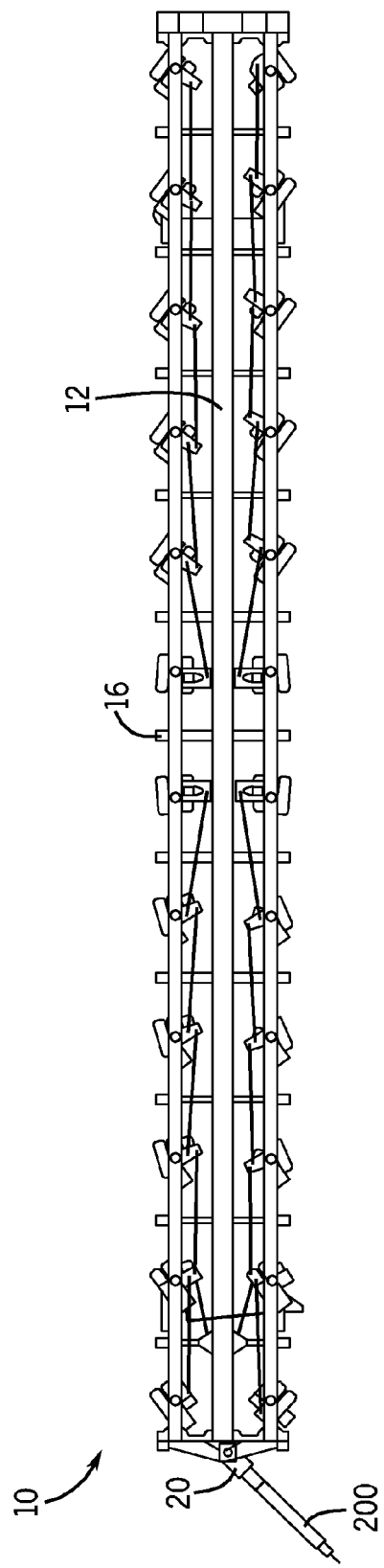
FIG. 3 is a top view of a trailer of the present invention depicting a turn radius of the trailer.

Referring now to the FIGS. 1 and 2 a preferred configuration of the trailer 10 of the present invention is shown that is suitable for use both on and off the highway. The trailer 10 is shown coupled to a pull vehicle 14 via a tow bar system 200. The tow bar 200 includes a hinge 20 that is coupled to a swivel 22 and aligned with a longitudinal center of frame 12 of the trailer 10. The tow bar 200 is used to actuate a steering system of the present invention. The trailer frame is shown having one hauling carriage or a center spine 30, but those skilled in the art will appreciate that two spines may be combined together to haul some loads without departing from the present invention. Those skilled in the art will also appreciate that the trailer frame could be hauled via the use of a fifth wheel coupling or other towing arrangement other than the tow bar of the present invention.

The trailer 10 is shown having twelve axle lines 18 and each axle line, row, segment, or section has a pair of legs 24 that each include an axle and suspension assembly 100. Those skilled in the art will appreciate that that the trailer 10 may be modified to include more or less axle lines than those depicted in the drawings without departing from the scope of the present invention. Each leg 24 is mounted to the left and right of the longitudinal centerline of the frame 12 (looking from an end or front view) to maximize stability. Each leg 24 further includes an axle and a single tire or wheel 26 bolted to a hub 28 at each end of the axle. The trailer 10 is further divided into a front and rear halves. The front half of the trailer includes six axle lines 18 and the rear half includes six axle lines 18. The lengthwise center of the trailer and the Center of Gravity (COG) 17 of the trailer is shown in FIG. 2. Note that the COG is offset slightly behind the lengthwise center 16 of the trailer. Hence there is a cargo offset from the lengthwise center of the trailer, wherein cargo payload increases as the cargo offset behind the COG is reduced. Without limitation intended, in an embodiment of the invention the trailer 10 has an overall length of approximately 107 feet and an overall width of approximately 10 feet and a maximum cargo payload of 240,000 lbs. The axle lines 18 are spaced apart approximately 9 feet and are rated for 7250 lbs. A total of 48 tires support the trailer and may be, for example, a 245/70 with a radius of 17.5 mounted to a rim of known suitable construction having a rim rating that meets or exceeds 6,614 lbs at 50 mph. Each wheel of each leg of each line includes a braking system, steering and a hydraulic suspension that allows for equal cargo weight to be distributed over all the tires, FIG. 2 further depicts a capacity curve of the trailer 10 showing a fore and aft distance measured in inches from the COG and a corresponding total payload measured in KIPS. The load of the cargo is preferably distributed between the front half and the rear half of the trailer with the maximum capacity being approximately between the second through fifth axle lines and the eight through eleventh axle lines. The payload is also preferably distributed between the center spline and side rails such that the maximum load is centered over the center spline. For example, when a load of 55 KIPS is distributed over center spline, the load over the side rails should not exceed 35 KIPS to 45 KIPS (over an axle). Those skilled in the art will appreciate that the net payload of the argo decreases as the height or elevation of the cargo increases.

Referring next to FIGS. 3-7 the trailer 10 includes a frame 12 having a center spline 30 and outer rails 32. Laterally spaced outriggers 34 rigidly connect the two outer rails 32 to the center spine 30. Outriggers 34 further provide structural integrity to frame 12 and may include securement lugs 36. The front of the trailer further includes a pintle plate 38 to which the swivel 22 and hinge 20 are attached. Each axle line 18 includes a set of axle and suspension assemblies 100 that are connected to a corresponding outer rail 32. Steering rods 84-88 interconnect the tow bar 200 and axle lines 18 together and assist steering in phase as the tractor 14 turns. The lengths of the steering rods 84-88 are varied so that the wheels of the fore and aft most axle lines turn more than the wheels mounted to axle lines in the mid portion of the frame 12. This configuration allows for a small turning radius without requiring mechanical modifications to the steering system immediately before, during or after the turn.

Consistent axle orientation of the present invention helps reduce the trailer's propensity to sway, and additional features that will be described in greater detail below further improve the performance characteristics of the trailer. For example, unlike traditional off-highway platform trailers, the trailer system of the present invention employs consistent axle-suspension orientation and geometry, is equipped with a remote system that allows for steering control and re-alignment when the trailer gets out of line ("auto centering"), the suspension system of the present invention includes load cushioning and equalization via the use of hydraulic suspension, and the trailer system differentiates the amount of braking pressure applied to the brakes of the vehicle and to the brakes of each axle of the trailer.

The present inventions suspension system further has the ability to auto level back to a pre-established data point if desired during the movement of the trailer. This auto level feature further resolves horizontal force component, reducing trailer system sway. Further, differentiating the amount of braking pressure applied to the brakes of the vehicle and to the brakes of each axle of the trailer, reduces the propensity of the trailer getting out of phase when braking occurs at higher speeds.

In addition to the above features, the present inventions steering control system constantly communicates with an Electronic Brake System (EBS) and steering is adjusted according to the data received from the EBS. When the EBS reads an axle speed of greater than 12 mph the controller and remote are deactivated to ensure no accidental steering actuations occur at highway speeds.

Figure 8:
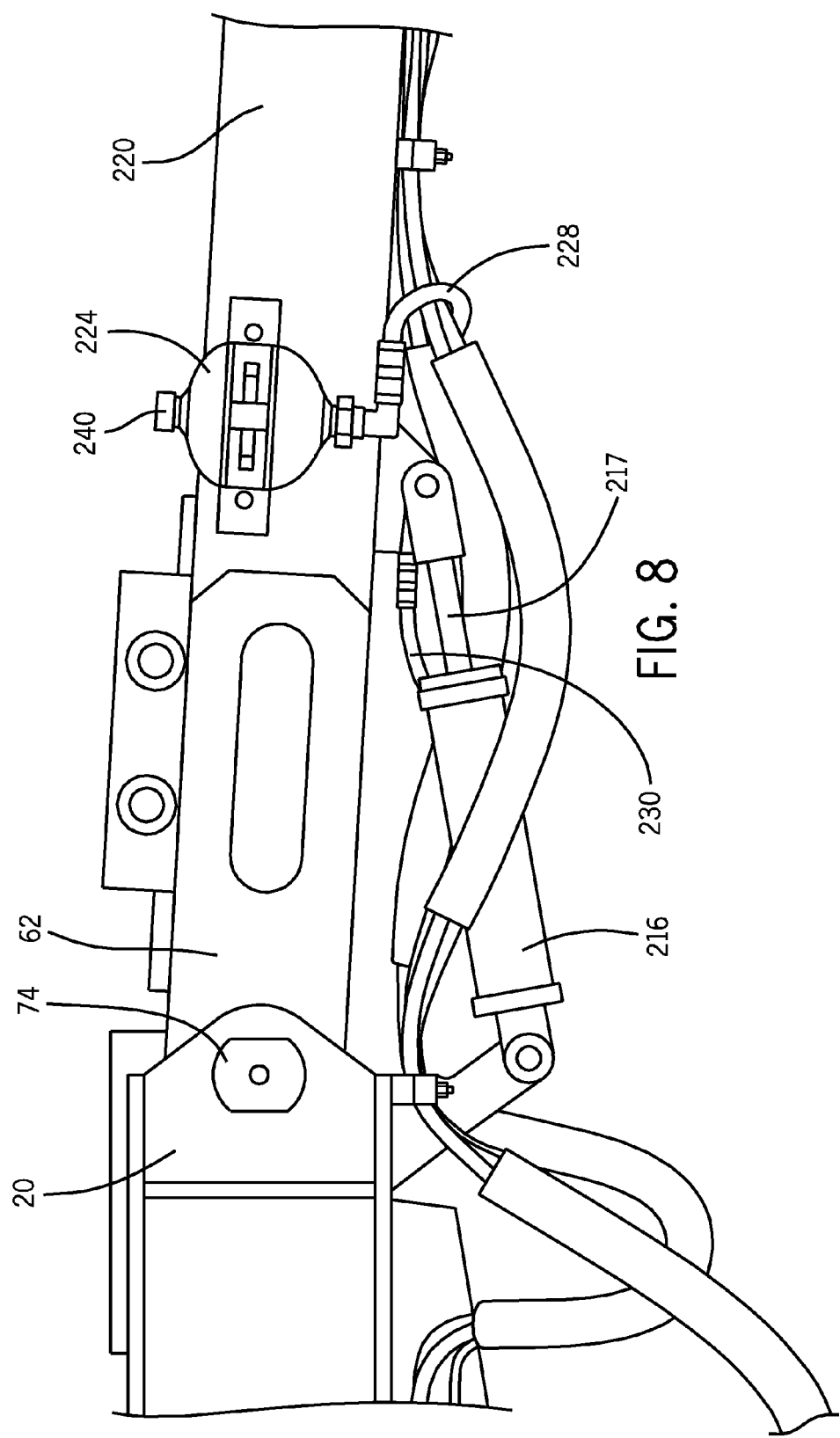
FIG. 8 is a side perspective view of a portion of the tow bar in accordance with the present invention.
Figure 9:
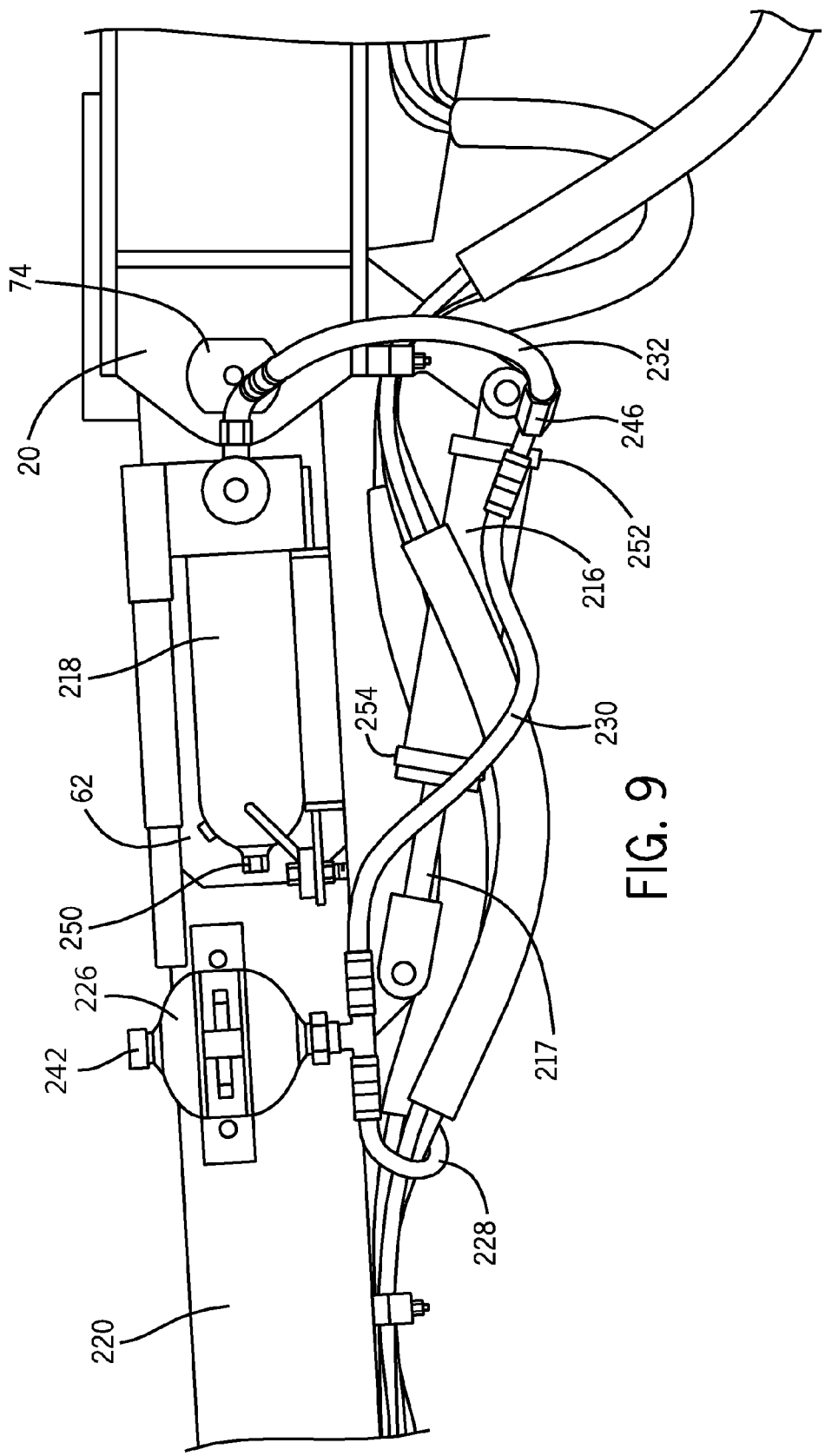
FIG. 9 is a side perspective view of a portion of the tow bar in accordance with the present invention opposing the side shown in FIG. 8.
Figure 10:
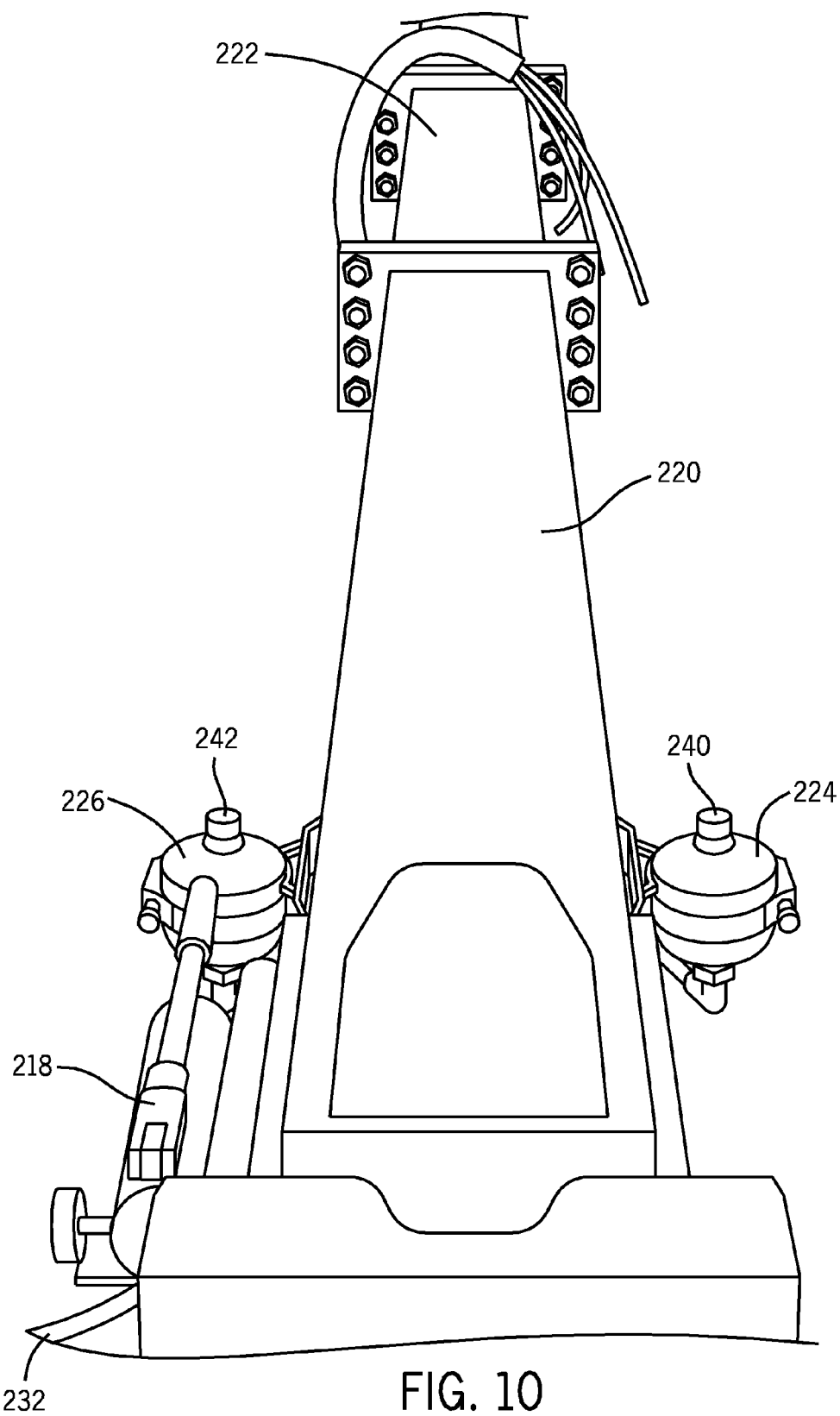
FIG. 10 is a top rear perspective view of a portion of the tow bar tongue in accordance with the present invention.

The steering system is further enabled with the use of the tow bar system 200. The tow bar system 200 of the present invention is shown in greater detail in FIGS. 8-10. The tow bar system includes a tongue 220 that may include a tractor hitch of known suitable construction coupled on one end of the tongue and a hinge 20 coupled to another end of the tongue. The tongue may also include a bolt connected segment interface 222 to allow a user to vary tow bar lengths depending on regulations and performance requirements. The tow bar system also includes a hydraulic cylinder 216 coupled to the tongue 220 and hinge 20. In the embodiment shown in FIG. 8, an extendable end of a hydraulic support cylinder 216 is mounted to the tongue 220 and the hinge 20 and swivel 22 is adapted to receive the other end of the hydraulic support cylinder 216. By connecting the tow bar 200 to a hinge and swivel, the tow bar may pivot both up and down and side to side.

The tow bar 200 system also includes a hydraulic fluid hand pump 218 mounted to the tow bar and coupled in fluid communication with the hydraulic cylinder 216 through hydraulic line 232. A preferred hand pump of suitable construction possesses a pressure rating in a range of 3,000-10,000 psi, an oil volume per stroke of 0.91 to 0.19 cubic inches, and an oil capacity of 30-70 cubic inches. The hand pump 218 includes a port 250 that allows for initial charge or recharging of the hydraulic lines. The size of the hydraulic cylinder 216 and pressure range of the hydraulic cylinder are dependent upon the tow bar weight, Center Of Gravity (COG) of the tongue 220, and desired up/down range of motion necessary for tow bar elevation range. The preferred pressure range is between 900 psi & 1,400 psi for the expected range of tongue weights for heavy haul trailers.

The tow bar system also includes two accumulators 224 and 226 that are mounted on the tow bar, one on each side of tongue 220, and that are coupled in series in fluid communication with hydraulic support cylinder 216. Each hydraulic accumulator 224, 226 includes a gas charging port 240 and 242 respectively. The tow bar hydraulic cylinder includes a quick coupler connection 246, of known suitable construction, that may be used to charge or provide pressure to the system during assembly, a bleed port 252 to evacuate air during internal charging of the system, and a breather 254 on the rod end 217 of the hydraulic cylinder 216. A closed hydraulic circuit is setup with the hand pump 218, cylinder 216, and low/high pressure accumulators 224/226.

The accumulators have a fixed volume that may contain both hydraulic fluid and a gas. The accumulators may be pressurized with the gas by charging the accumulators with the gas, nitrogen for example, through the charging ports 240 and 242. The accumulators are set with differing gas or nitrogen pressures prior to system use. The pressure of the gas within each accumulator applies a force against the hydraulic fluid within the accumulator and through the hydraulic lines 228 and 230 to the hydraulic cylinder 216. The pressurized hydraulic fluid applies a force against the cylinder rod 217 to force the rod out of the cylinder body. The mass of the tongue counteracts this force but when sufficient pressure is applied to the hydraulic fluid the rod 217 will extend out of the cylinder body.

The higher pressure accumulator 226 provides a volume and pre-charge to the hydraulic cylinder 216 so that the tow bar may be balanced at static conditions. The volume of gas within the accumulator 226 also allows for oscillation of the tongue 220 below horizontal to a desired angle, for example, 15 degrees below horizontal. The low pressure accumulator 224 provides sufficient suspension pre-charge to aid in vertical lift, and sufficient accumulator gas volume to provide for adequate hydraulic fluid displacement to ease range of motion. Those skilled in the art will appreciate that since the gas pressure in accumulator 224 is low, a downward force on the tongue will displace hydraulic fluid into the accumulator 224 reducing the volume of gas and increasing the pressure of the gas therein. The range of motion of the tow bar with minimal required force eases displacement in the vertical direction, and eases ability to setup and maneuver manually at the jobsite and connect at the tractor. Essentially, the hydraulic accumulators 224 and 226 provide a "balance" to the tongue so that reduced upward or downward force on the tongue is required to move the tongue respectively upward or downward.

After initial system pressurization, no separate power source is needed, other than a slight force on the tongue 220 from a user to actuate the cylinder. Further, the gas or nitrogen pressure within each accumulator 224 and 226 can be adjusted externally to provide more or less force against the cylinder rod. The dissimilar gas pressures within accumulators 224 and 226 further provides an opportunity for the user to balance between tow bar weight, Center Of Gravity (COG) of the tongue, and desired up/down range of motion.

During use, a user may charge the accumulators 226 and 224 to a calculated theoretical charge so that the nitrogen pressure from the accumulators will provide the balance and assist required range of motion. For example without limitation intended, a tow bar of sufficient weight for heavy hauling may require a charge of 870 psi in the high pressure accumulator 226 and 360 psi in the low pressure accumulator so that the tow bar balances at neutral. The low pressure setting is determined as a function of the desired range of motion of the tow bar above neutral. Once the accumulators 226 and 224 are charged, the user may charge the hydraulic fluid lines 228, 230, and 232 with hydraulic fluid. When the lines are filled with sufficient fluid and air is bled from the lines (bleeder valve 252 and breather port 254 may be utilized), the tongue may be elevated to horizontal and balance itself. The nitrogen charge can be varied in accumulators 226 and 224 to modify amount of assistance and amount of support provided.

A user may charge the hydraulic fluid lines 228, 230 and 232 with a hydraulic fluid utilizing an external hydraulic supply unit. The nitrogen pressure within accumulator 226 and 224 and the pressure of the hydraulic fluid within the cylinder 216 is of sufficient charge so that the force of the hydraulic fluid against the cylinder rod is of sufficient force to overcome the downward force of the mass of the tongue 220. Increasing the gas pressure within accumulator 226 will increase the force applied by the hydraulic fluid to the cylinder rod 217. Once the desired balance is achieved, when the user applies a slight upward or downward force against the tongue, the hydraulic fluid in the lines is displaced and the gas volume within accumulator 224 is either increased or decreased.

In present invention, steering of the trailer may be actuated in conjunction with the pivot of tow bar 200 or steering may be accomplished with a manual steering. Although a tow bar of the present invention is preferred those skilled in the art will appreciate that other trailer connections may be used including, without limitation, a fifth wheel style trailer connection. The tow bar 200 is connected to swivel 22 and is capable of actuating a steer angle of up to fifty degrees with an inner turn radius of approximately 32 feet 10 inches and an outer turn radius 66 feet. In present embodiment, a blue tooth remote system can over steer to a maximum of 54 degrees. This is optimal for creating separation between the tow bar 200 and trailer 10 once the tow bar has achieved maximum steering angle. When remote steering is activated the system automatically overcompensates for the situation and avoids lateral stresses to the tow bar.

Figure 11:
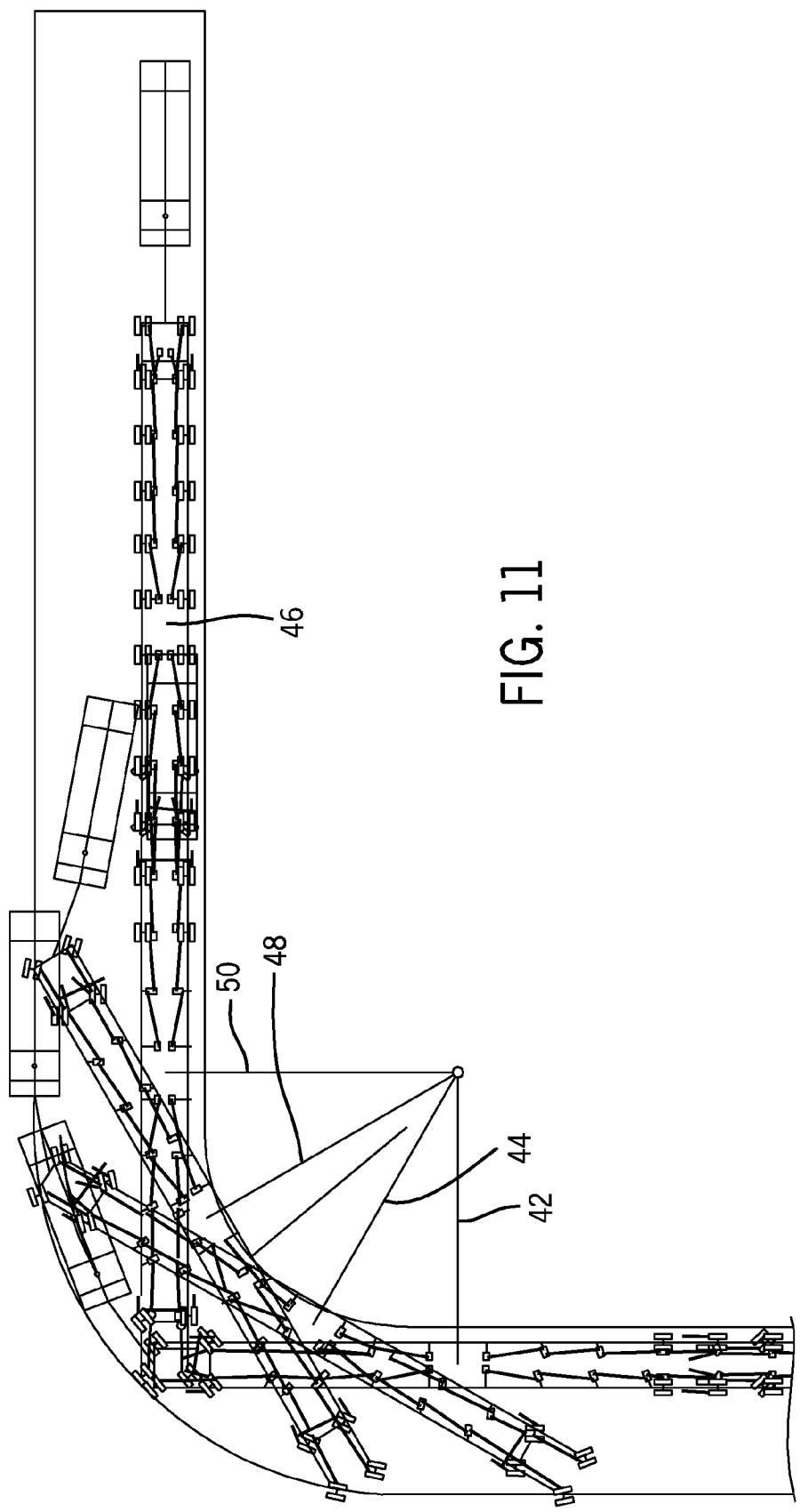
FIG. 11 is a top diagram depicting several phases of a trailer turning through a ninety degree turn.
Figure 12A:
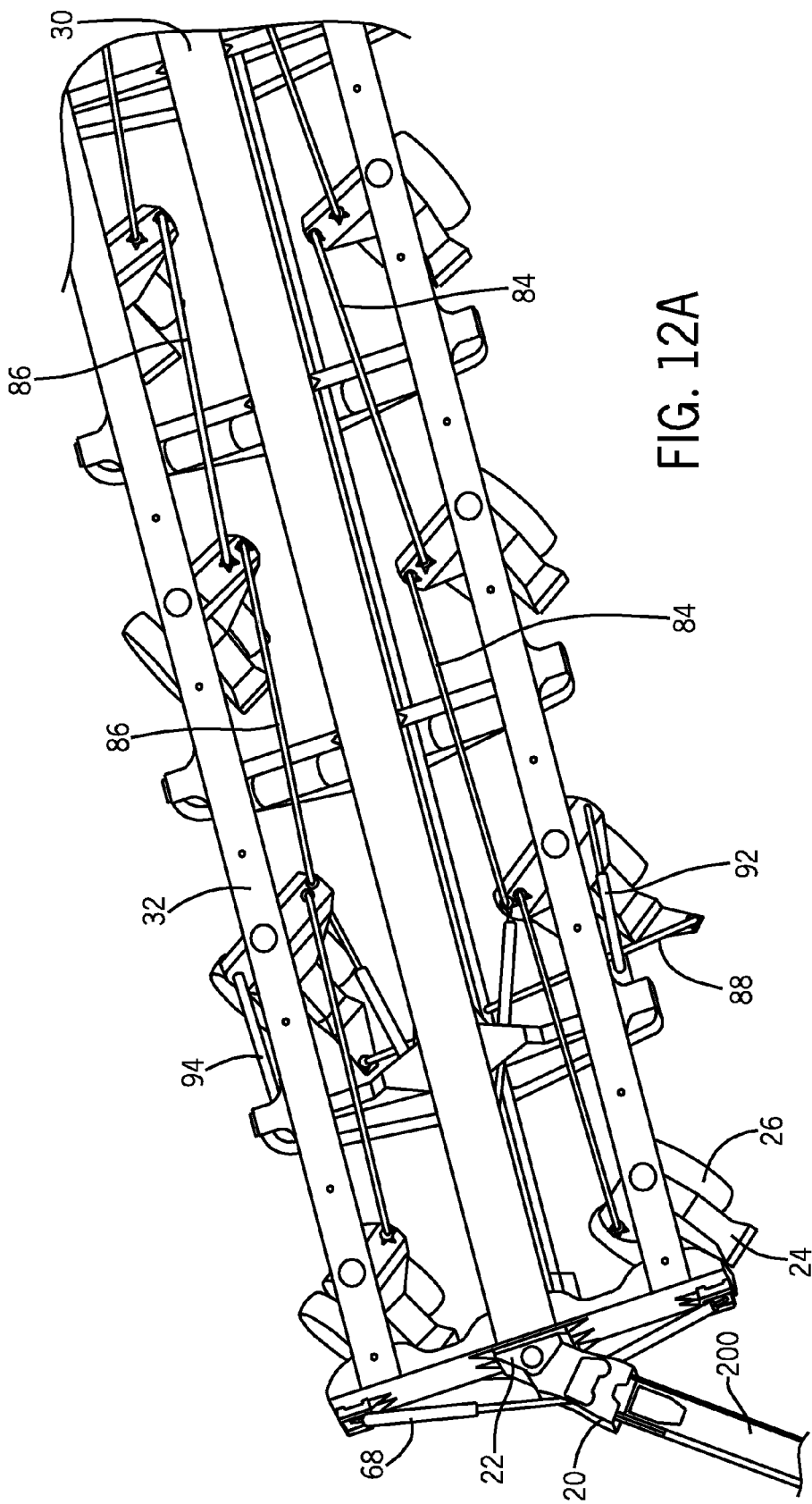
FIG. 12A is a partial sectional top perspective view of the trailer in accordance with the present invention.
Figure 12B:
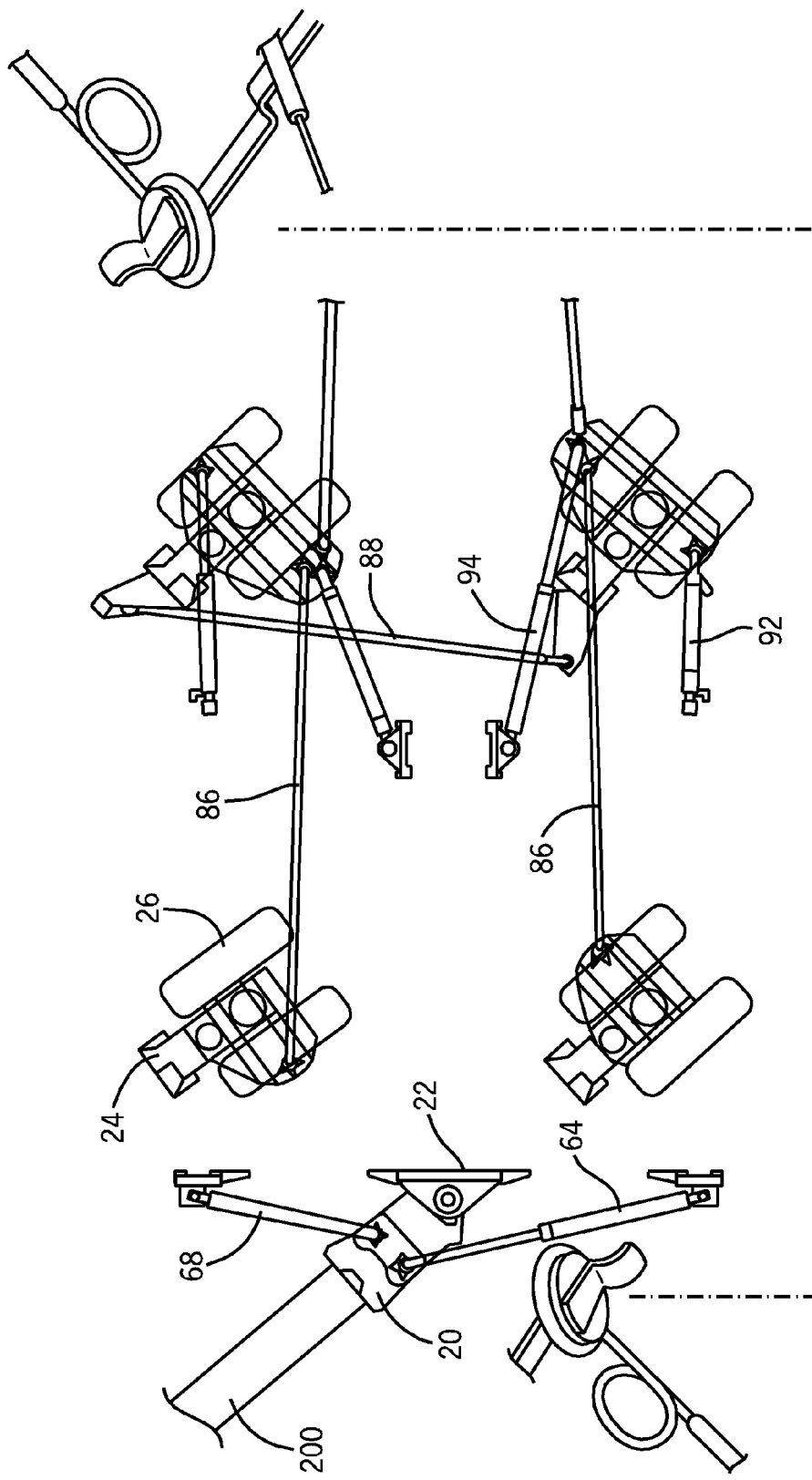
FIG. 12B is a top exploded view of portions of the trailer in accordance with the present invention.
Figure 13:
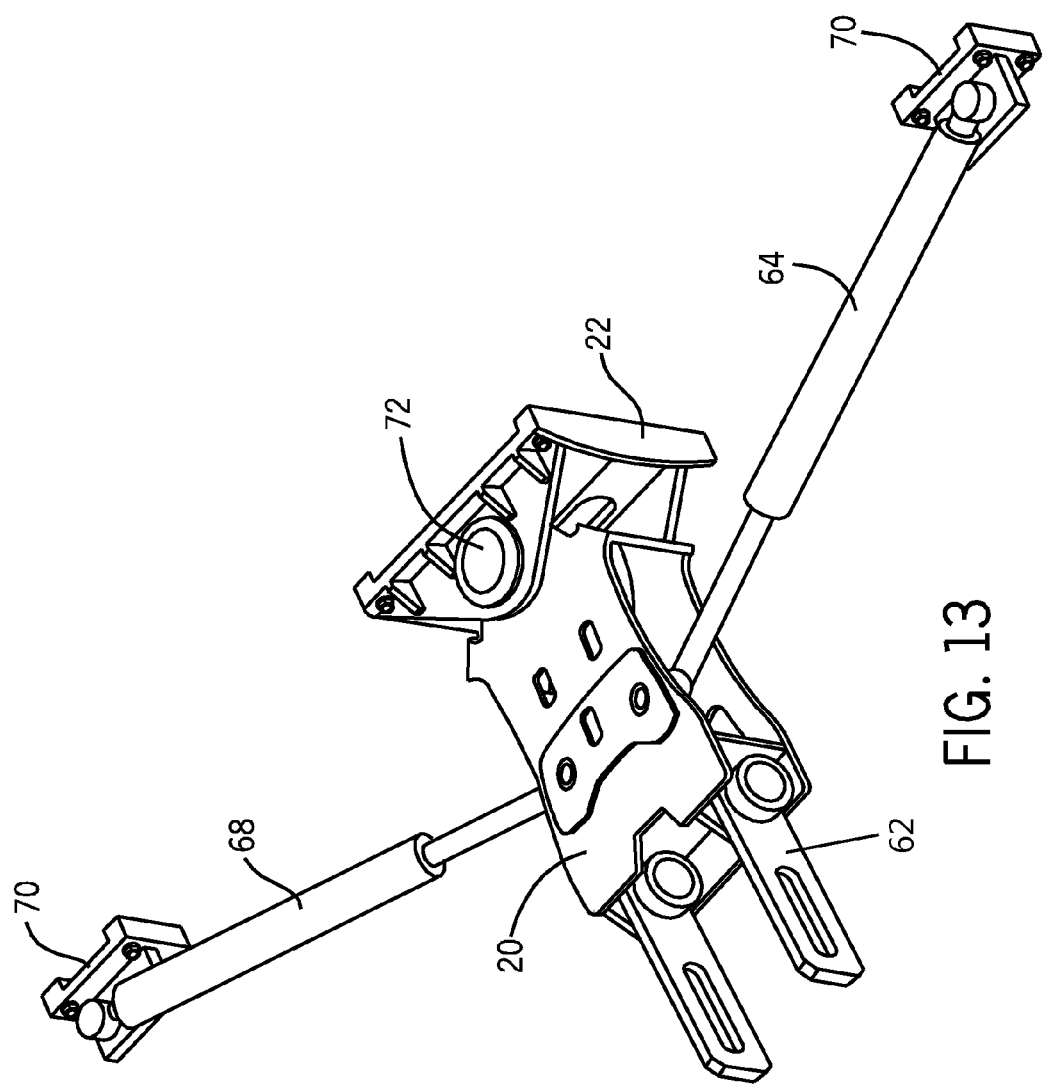
FIG. 13 is a top perspective view of a swivel bar of the tow bar of the present invention.

Referring now to FIGS. 11 through 13 the steering system of the present invention will be described in greater detail. The steering system of the present invention provides for a tight turning radius to reduce contact of the tires with road curbs, reduces pavement transverse shear forces, and increases maneuverability in and out of turns. Those skilled in the art will appreciate that the trailer of the present invention utilizes round steer which is distinguished from a graduated steer or selective axle steering. As seen in see FIG. 11, as the trailer enters a turn the wheels of the front axle lines begin to turn while the rear axle lines remain straight (see trailer 42). The steering system actuates the tire assemblies of each axle line at angles independent of the orientation of the tire assemblies of other axle lines. As described below in more detail, the steering system is dependent upon a relative speed of the trailer system. As the trailer turns through the turn, the front axle line wheels turn towards the turn and the rear axle line wheels turn away from the turn (see trailer 44 and trailer 48). As the trailer turn out of the turn the wheels of the front axle lines are straight while the rear axle lines remain turned (see trailer 50). Once out of the turn all the wheel of all the axle lines are again straight (see trailer 46).

With prior trailers having fixed axles and wheels (no steering) or graduated steering, as the prior trailer maneuvers around a curve, the last axle or potentially the second to last axle is the projection line for the vehicle. The focal point for steering is about the last axle which dictates large turning geometry for the vehicle and all other axles attempting to project to this focal point. If the axles are rigidly mounted about the chassis, the focal point for steering is about the last axle. In contrast, a round steer trailer focal point for steering is approximately the center of the trailer. The benefit of having the steering focal point near the middle of the trailer includes a significant reduction in inner and outer turning radius.

The trailer 10 of the present invention will force-steer the front half of the axle lines in the direction of travel in a synchronization that causes the front axles to have a common focal point in the middle of the trailer 16. The rear half of the axle lines will have a similar forced-steer mechanism with a synchronization that causes the rear axles to have a common focal point toward the middle of the trailer 16, however the tires steer in a direction away from the travel of the front of the trailer. By steering the rear half of the trailer away from the direction of travel of the front of the trailer a circular or round steering movement is created.

When travelling at higher speeds the round steer may provide more steering than desired and results in system sway. To reduce system sway at higher speeds the amount the rear axles are able to steer could be reduced or locked in place to allow no steering, however the turning radius of the trailer is increased which places undesirable lateral forces on the chassis in addition to the other forces seen at the tie rod and transfer levers. To minimize system sway at high speeds the trailer of the present invention provides the ability to "zero" the system out to pre-established datum point with remote control ("Auto Centering") and oversteer ("steering on the fly") when the trailer travels at speeds up to 12 mph. The "on the fly" steering of the present invention allows remote steering actuation without requiring the trailer operator to mechanically unlock a device (strut or cylinder).

When travelling at speeds exceeding about 12 mph the trailer operator may reduce the steering sensitivity or rate of travel of the rear axle line so that the steering ratio is reduced by approximately 2.3 degrees from front to rear. The reduction in steering sensitivity effectively moves the steering focal point from the middle of the trailer 16 to about axle line 9, creating a slight drag at the rear of the trailer during steering movements. This slight drag, however, effectively reduces system sway at higher rates of trailer travel.

As seen in FIGS. 12A and 12B, each axle line includes a pair of leg assemblies, each leg assembly 24 being swivel mounted to outer rail 32 on opposing sides of the center spline 30. The tow bar 200 is pin connected to the swivel system 22. The swivel system 22 includes a left steer hydraulic cylinder 64 and right steer hydraulic cylinder 68. Swivel sensor 80 is used to determine the position and alignment of swivel 22. The left legs 24 and right legs 24 of each of the front six axle lines are mechanically linked together with left linkage rod 84 and right linkage rod 86. Similarly, the left legs 24 and right legs 24 of each of the rear six axle lines are mechanically linked together with left linkage rod 85 and right linkage rod 87 (see FIG. 7).

The left and right leg 24 of axle line 2 and axle line 11 are also linked laterally via a transverse connecting rod 88. The transverse connecting rod 88 is pivotally attached to leg 24. The connecting rod 88 extends through an aperture formed in center spline 30 and serves as a tie rod between the left and right leg assemblies. Actuation of the front six axle lines from left to right is accomplished hydraulically with respective left and right hydraulic cylinders 92 and 94, while actuation of the rear six axle lines from left to right is accomplished hydraulically with respective left and right hydraulic cylinders 96 and 98. Sensors 82 are mounted to each leg 24 to measure left to right actuation or swivel. The swivel 22 includes a swivel pin 72 and hinge rotation pin 74 and arms 62 of the hinge 20 couple to the tow bar 200. The left steer cylinder 64 and right steer cylinder 68 are mounted to the pintle plate 38 of front of the trailer with mounting brackets 70.

In use, as the tractor and tow bar turns or rotates, the amount hydraulic cylinders 64 and 68 actuate and the pivot of the swivel sensed by sensor 80 is synchronized with actuation of hydraulic cylinders 92, 94, 96, and 98. The carriage is divided into two steering systems (front and rear). The front portion of the steering system comprises the first six axles (1-6), and the rear portion of the steering system comprises the rear six axles (7-12). A hydraulic signal is created that is dependent upon the amount of actuation of the hydraulic cylinder at axle 2 ("master cylinder"). This signal is sent to the rear axle steering portion of the system at axle 11 ("slave cylinder"). In this manner, the amount each of the front wheels turn is mirrored by a corresponding rear wheel. Those skilled in the art will appreciate that the hydraulic circuits are preferably fully redundant to promote operation even in the event of the hydraulic failure of one steering circuit.

Further, six valve switches ("short-cut manual valve") located at the front of trailer provide the user with the option of varying between normal and manual steering without the need to mechanically lock or unlock mechanisms on the trailer. Under normal steering, there is direct relation between the amount each leg of the front axle line swivels with a corresponding leg of the rear axle line. Normal steering can also be corrected manually by remote control unit. During manual correction the legs of the axle assemblies all turn in round steer rather than swivel movement. The lengths of the steering linkage rods 84-87 may be varied so that the forward most and rearward most tires turn more than the tires in the mid-section of the trailer.

Manual steering via remote control can occur up until 12 miles per hour. This feature is disabled via the applicable CPU at speeds exceeding 12 miles per hour. Steering system is also equipped with a remote system that allows for steering control and alignment when the trailer gets out of line or during system over steer, for example. By way of example but without limitation, the system remote can over-steer the system on the fly when the trailer is operating at less than 12 mph without the manipulation of any manual valves, and also realigns steering should the need arise. In addition, the steering system controls 302 constantly communicates with an Electronic Brake System (EBS) 152 and steering is adjusted according to data received from the EBS. When the EBS reads an axle speed of greater than 12 mph the controller and remote are deactivated.

All of the aforementioned features help minimize sway. To further reduce system sway an additional pair of steering "reduction" cylinders 96 and 98 may be added to the rear axle line to further desensitize trader steering at high speeds and to further improve performance while still maintaining full functionality at lower speeds. The additional rear steer cylinders may be connected hydraulically into the rear steer circuit. In addition, a short-cut manual valve, similar to the one mounted at the front of the trader, may be added for user simplicity. Since the extra steer cylinders require system hydraulic oil, the addition of these cylinders to the circuit creates the demand for hydraulic oil to be pumped to these cylinders as well as the other slave cylinders 96 and 98. This additional hydraulic requirement creates a delay and slight drag at the rear of the trailer during steering movements, which result in reduced system sway.

When the operator desires full steering the extra rear cylinders are left out of the steering relationship by flipping the valve up. Eliminating the extra rear cylinders may be desirable when, for example, the operator is on a job site or during off highway travel. When the trailer operator wants to reduce the rate of travel at the rear (during higher speed travel), the extra cylinders will be engaged by flipping the valve down, and the steering ratio is cut by approximately 2.3 degrees from front to rear. This moves the steering focal point to about axle 9, and this creates a slight drag at the rear of the trailer during steering movements.

Each leg 24 further includes a suspension system that has load cushioning and equalization via the use of a hydraulic suspension. The suspension system further has the ability to auto level and auto zero back to pre-established data point should the need arise at any point during the movement of the trailer.

Figure 18:
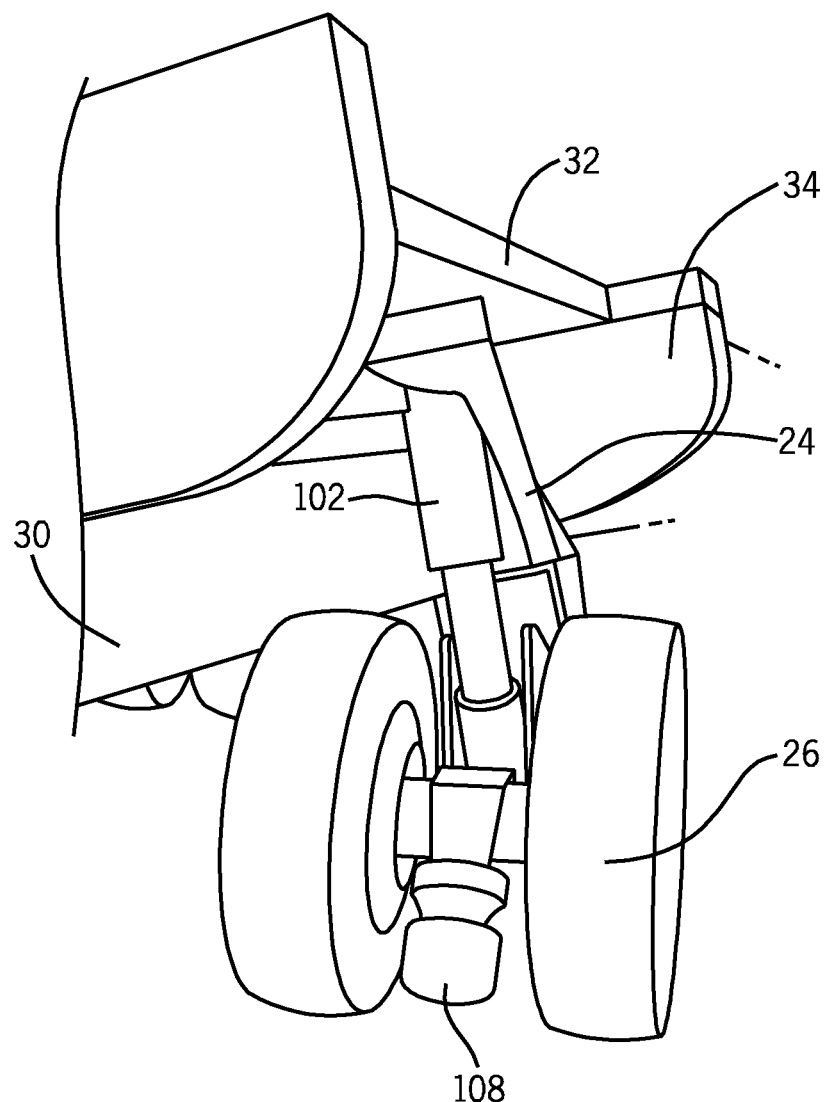
FIG. 18 is a partial sectional perspective view of a leg assembly shown tilting the carriage of the trailer of the present invention.

With reference to FIGS. 14-17, the leg and suspension assembly 100 includes a lift cylinder 102 that actuates the leg joint 106 about a bearing 114 between a raised and lowered position (compare FIGS. 14 and 15). The bearing 114 is positioned below the neutral center of hub 28 to provide an underslung configuration. The lift cylinder rotates about bearings 112 and 116 and provides suspension travel or stroke. The bearings 112, 114, and 116 may be of the rubber bushing type to dampen vibrations and allow minor axle over uneven road surfaces and forward travel. The lift cylinder may provide up to 22 inches of oscillation between the raised and lowered position. The leg and suspension assembly further includes air shocks 108 that provide a cushion to the suspension system. A height sensor 120 is mounted to the leg assembly to determine the position of the leg between the lowered and raised positions. When fully raised (see FIGS. 14 and 18), the cylinder 102 is in the extended position. When lowered, a catch hook 118 may be utilized to lock the suspension in the lowered position or alternatively selected axle lines may be raised above the road surface 104 while other axle lines remain in contact with the road. The leg and suspension assembly 100 is mounted to the outer rails 32 with a swivel bearing 110. To provide additional stability and reduced trailer sway at higher speeds, the front six axle lines have the joint 106 positioned closer to the front of the trailer than the swivel bearing 110 while the rear six axle lines have the joint 106 positioned closer to the rear of the trailer than the swivel bearing 110.

Typically, trailers utilized in North America for on-highway use require longer spacing between axle lines to meet highway regulations. The greater distance between axle lines may affect cargo torsion, system equalization, and a systems ability to handle super elevations, road grades, and crowns. The longer axle spacing requirement (9'-1" in some instances) also limits the type of suspension system that obtain equalization. As a result, traditional walking beam or air ride systems are not suitable for use. The trailer of the present invention utilizes hydraulic suspension to obtain the equalization and maximize respective payloads. The hydraulic suspension of the present invention is also equipped with three stage nitrogen accumulators to aid in the load cushioning of various cargo depending on the capacity of rated load detected by the system.

The development and incorporation of the auto leveling feature provides two main benefits over the prior art. First, this helps ensure uniform support to cargo. Second, it also increases the overall stability of the combination when going into elevations, road crowns, etc.

The suspension system of the present invention is equipped with a height sensor to vary suspension positions and to auto level the suspension when necessary. The auto leveling feature also helps ensure uniform support to cargo. In an embodiment of the present invention, the overall suspension system is configured with three hydraulic suspension zones: (1) front; (2) rear left; and (3) rear right. Height sensors are positioned at axle line 2 on the left side of the spline 30, and on each side of the spline at axle line 9. It is further contemplated that alternate suspension zones could include two or four zones depending on user requirements, and the respective location of the height sensors would be modified accordingly.

Each axle and suspension assembly 100 further includes two tires 26 mounted to hub 28 allowing for better pavement loading by creating two small patch areas that exponentially reduce pavement tensile stresses and reduce the volume of the pressure bulb in the subgrade. In addition, the single tire on each side of the suspension allows the suspension to be widened creating a more stable trailer as compared to a standard dual tire arrangement by allowing for a wider stability triangle on this type of trailer configuration. Further, the present invention meets the need for an overall width suitable for use in single lane, high speed travel with an increased axle line capacity and equalization of loads to the pavement. Prior systems were typically equipped with dual tires that have decreased axle capacities based on the dual tire loading. In addition, the inner dual takes a disproportionate share of the tire loading.

The present invention also differentiates the amount of braking pressure applied to the brakes of the vehicle and to the brakes of each axle of the trailer. Further, the present invention includes the combination of air, anti lock and an electronic braking system. The braking subsystem further includes the components necessary to automatically sense forces applied from the load to synchronize the vehicle and trailer braking. A controller 152 is utilized to sense and monitor the brake pressures. Further, the EBS system provides a proportional force to the brakes depending on the load situation. For example, a uniform brake to all wheels is not applied, but rather a braking force is applied that is more individualized based on the size and COG of the cargo on the top of the trailer relative to the trailer's COG. The amount of braking is based on the suspension pressure which is a measure of mass per applicable suspension zone, which in the present embodiment is three suspension zones. The benefits of this system are two-fold. First, it improves the inventions overall braking ability. Second, it helps reduce system sway by providing a more localized solution to braking at higher speeds. The frame, steering, braking, and suspension subcomponents have been described generally and may be of suitable constructions with modifications made as necessary to couple and function with the trailer of the present invention in the manner described herein.

Figure 19:
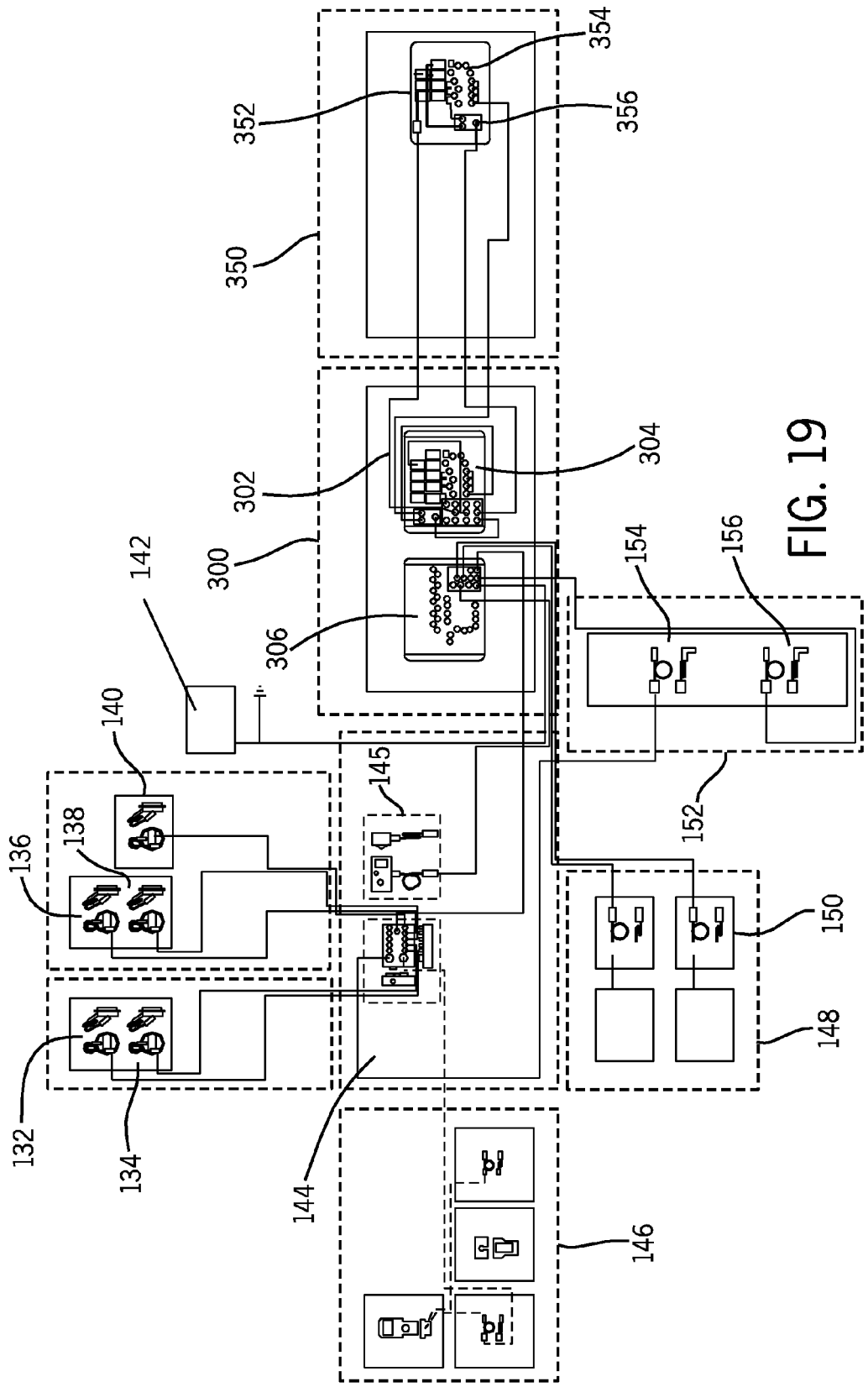
FIG. 19 is a block diagram of the steering, braking and suspension systems of the trailer of the present invention.
Figure 20:
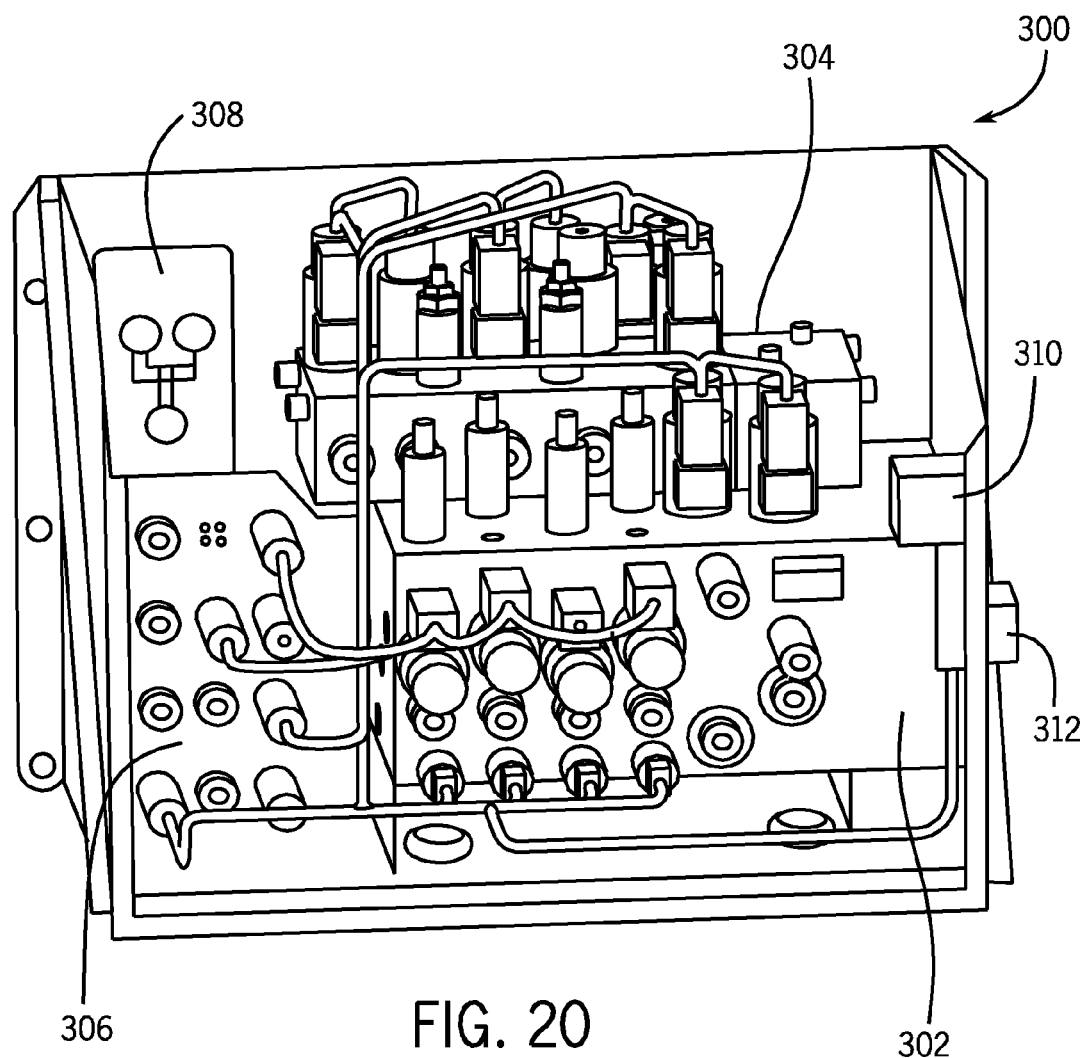
FIG. 20 is a perspective view of the main steering and rear suspension control box for the trailer of the present invention.
Figure 21:
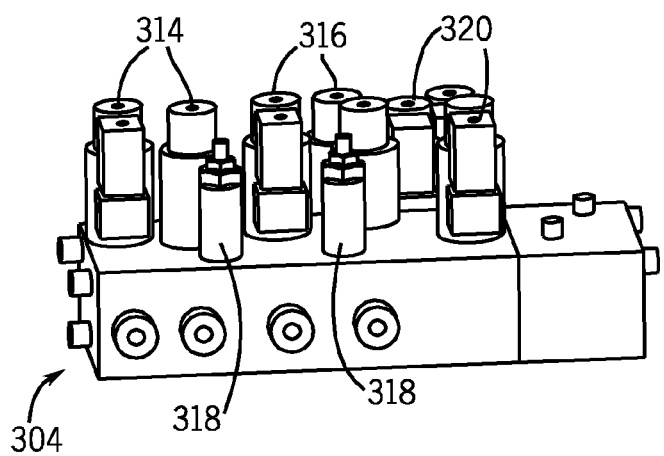
FIG. 21 is a perspective view of the rear suspension control for the trailer of the present invention.
Figure 22:
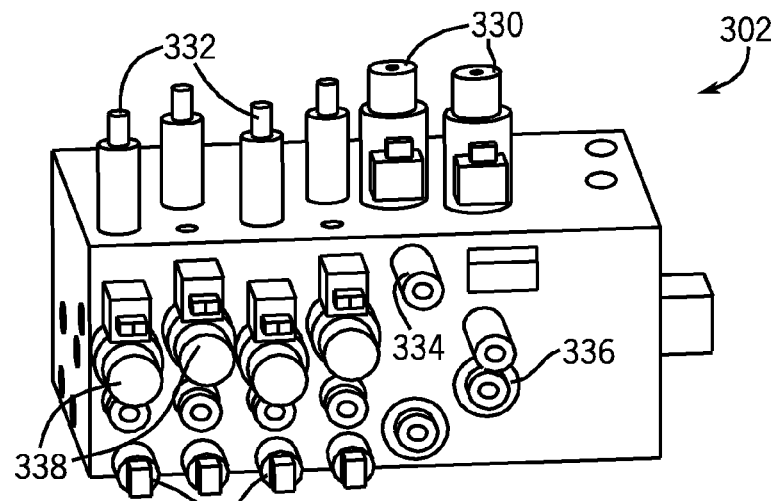
FIG. 22 is a perspective view of the main steering control or the trailer of the present invention.
Figure 23:
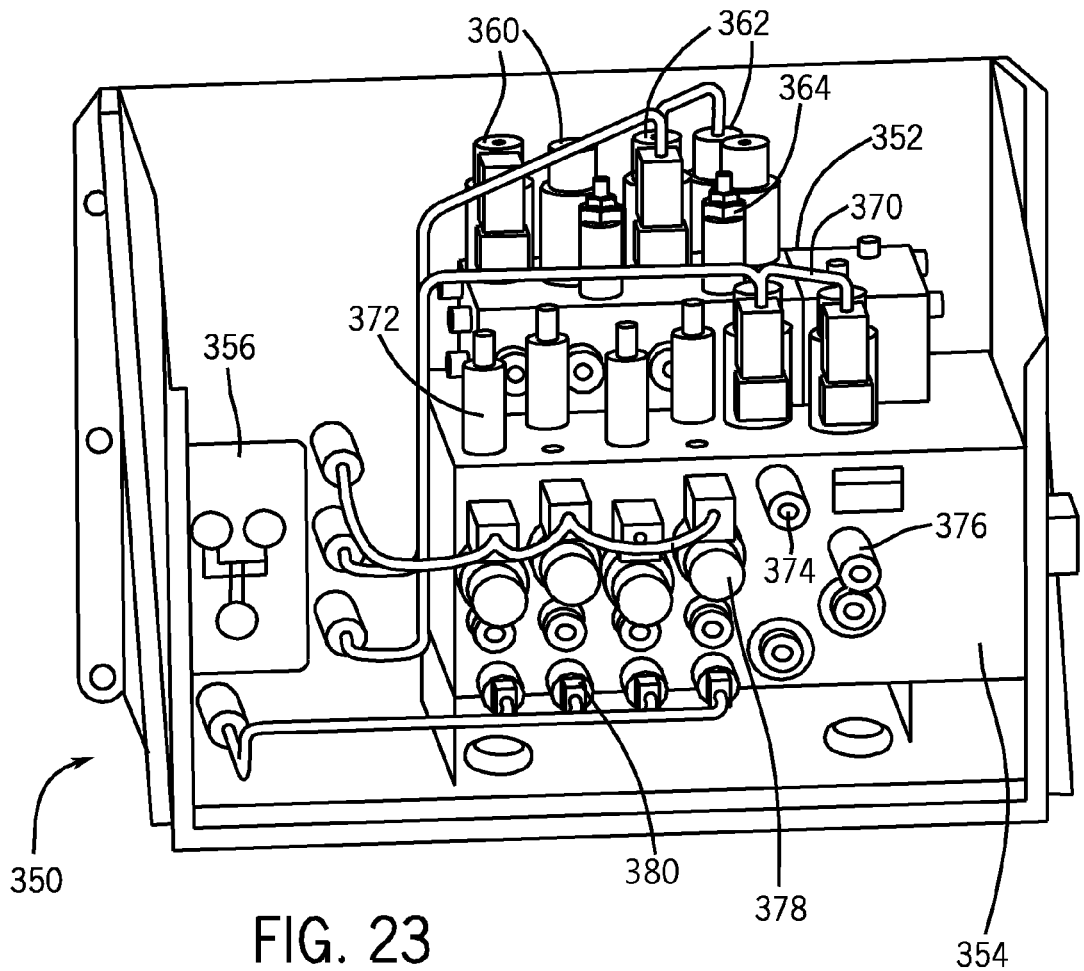
FIG. 23 is a perspective view of the front suspension and rear steer control box for the trailer of the present invention.

With reference now to FIG. 19 the steering system, braking control system 152 and suspension systems 100 will be described in greater detail. Processor 144 includes electrical data inputs from hydraulic cylinder sensors (including swivel sensors 132, axle sensors 134, left rear height sensors 136 and right rear height sensor 138, front height sensor 140), control module 145 and remote user control module 146, hydraulic pump 148 (having a dual pump output of 4 g/min for steering and 15 g/min for steering and including hydraulic pump sensors 150), electronic brake system 152 (including power cable and speed sensors 154 and 156), hydraulic steering and suspension controllers 300 (including main steer 302, rear suspension 304, and switchbox 306) and controller 350 (including front suspension 352, rear steer 354, and splitter 356). The processor 144 is powered by power supply 142 which in turn powers the connected components.

FIGS. 20-23 further illustrates the main controller 300 and sub controller 350. Control box 300 includes main steering module 302 rear suspension module 304, switchbox 306, splitter 308, pump switch 310 and hand pump port 312. The rear suspension module 304 includes solenoid actuated right rear suspension valves 314, left rear suspension valves 316, overpressure valve 318 and auxiliary in and out valves 320. The main steering module 302 includes solenoid actuated main steer valves 330, four overpressure steer valves 332, overpressure manual steer valve 334, pre-pressure valves 336, shortcut valves 338 and pressure sensors 340. Secondary control box 350 includes front suspension module 352, rear steering module 354, and splitter 356. The front suspension module 352 includes solenoid actuated right front suspension valves 360, left front suspension valve 362, and overpressure valve 364. The rear steer module 354 includes solenoid actuated rear steer valves 370, overpressure valves 372, overpressure manual valve 374, pre-pressure valve 376, shortcut valve 378, and pressure sensor 380.

Figure 24:
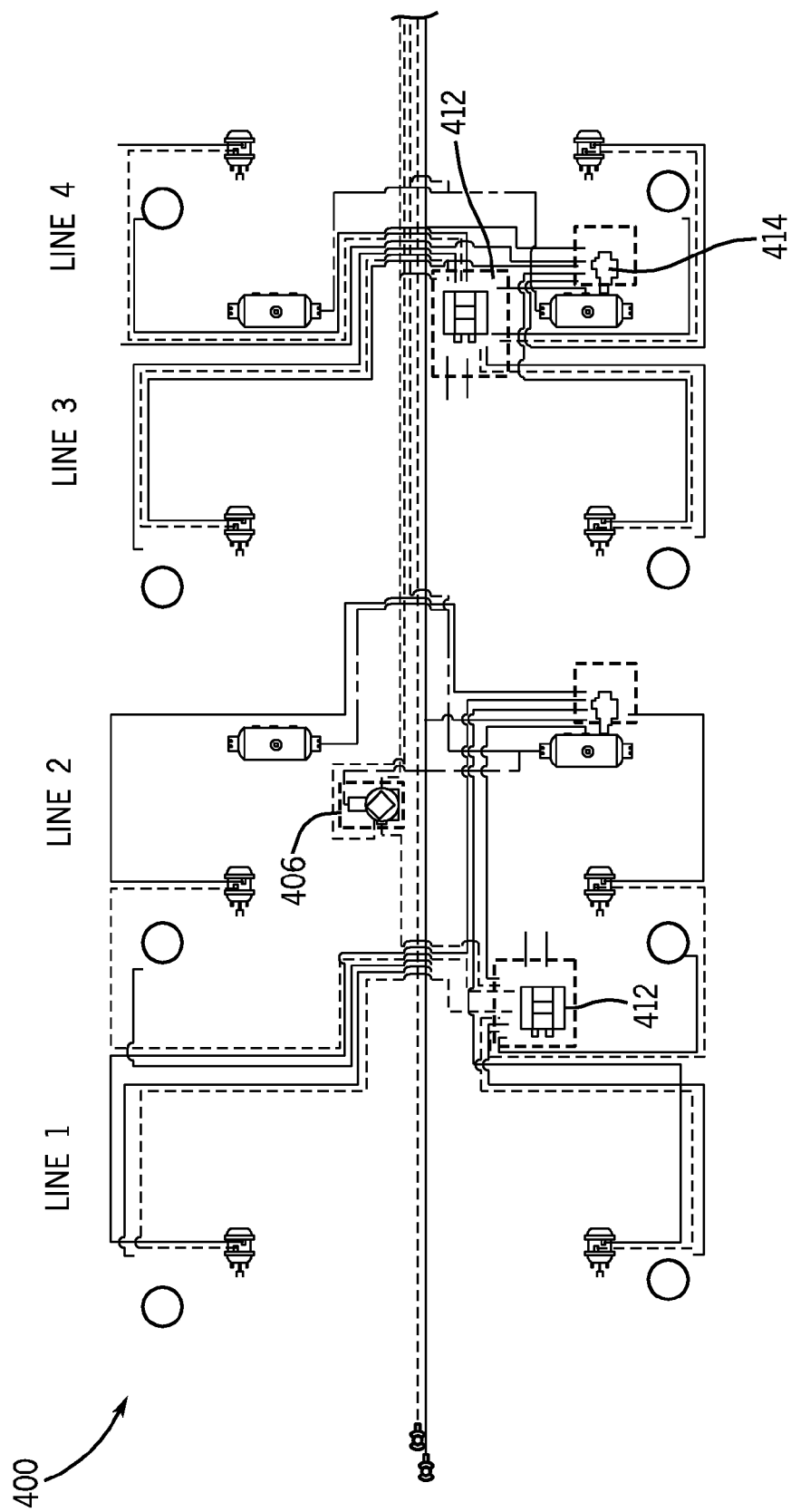
FIGS. 24-26 in combination is a schematic representation of the brake control system for the trailer of the present invention.
Figure 25:
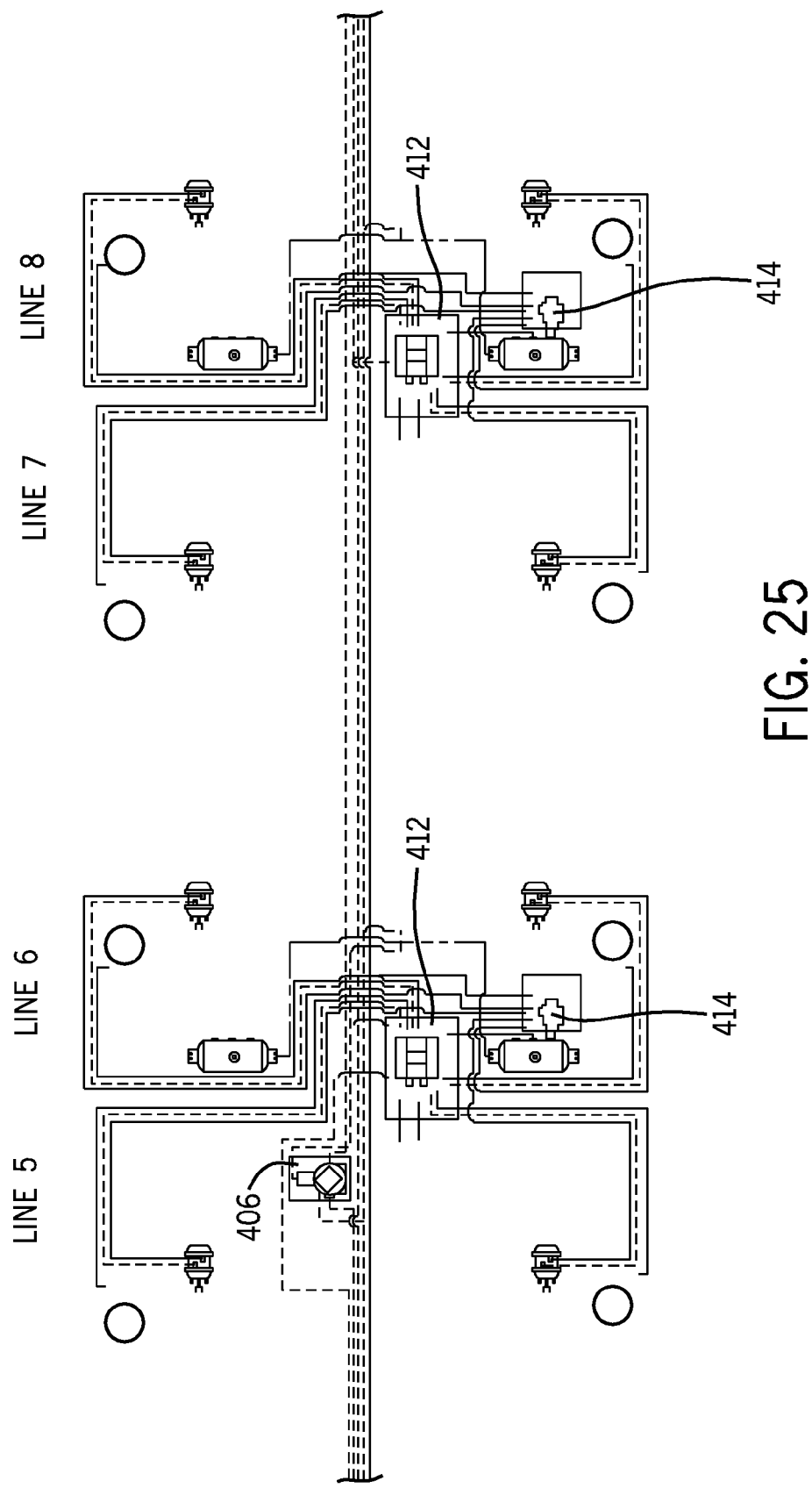
Figure 26:
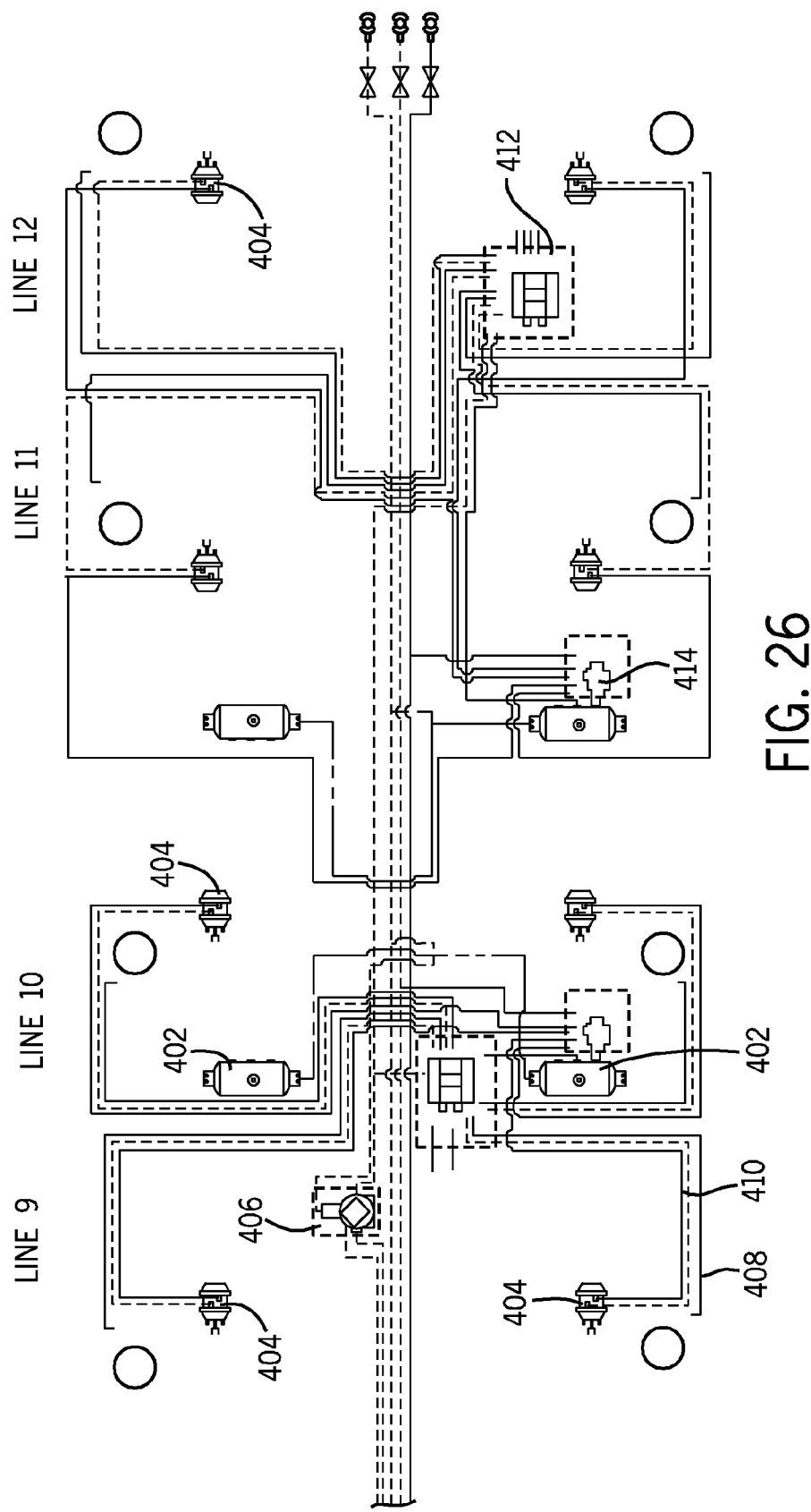

With reference to FIGS. 24-26 a braking schematic 400 is shown that illustrates an arrangement of the braking components in greater detail. Each axle and suspension assembly 100 of the left and right leg of each axle line includes a braking system for each tire. The braking system includes an air reservoir 402, booster 404, control line booster 406, and sensor cables 408 and 410. A pair of axle lines share an ABS electronic control unit 412 and brake valve 414.

Figure 27:
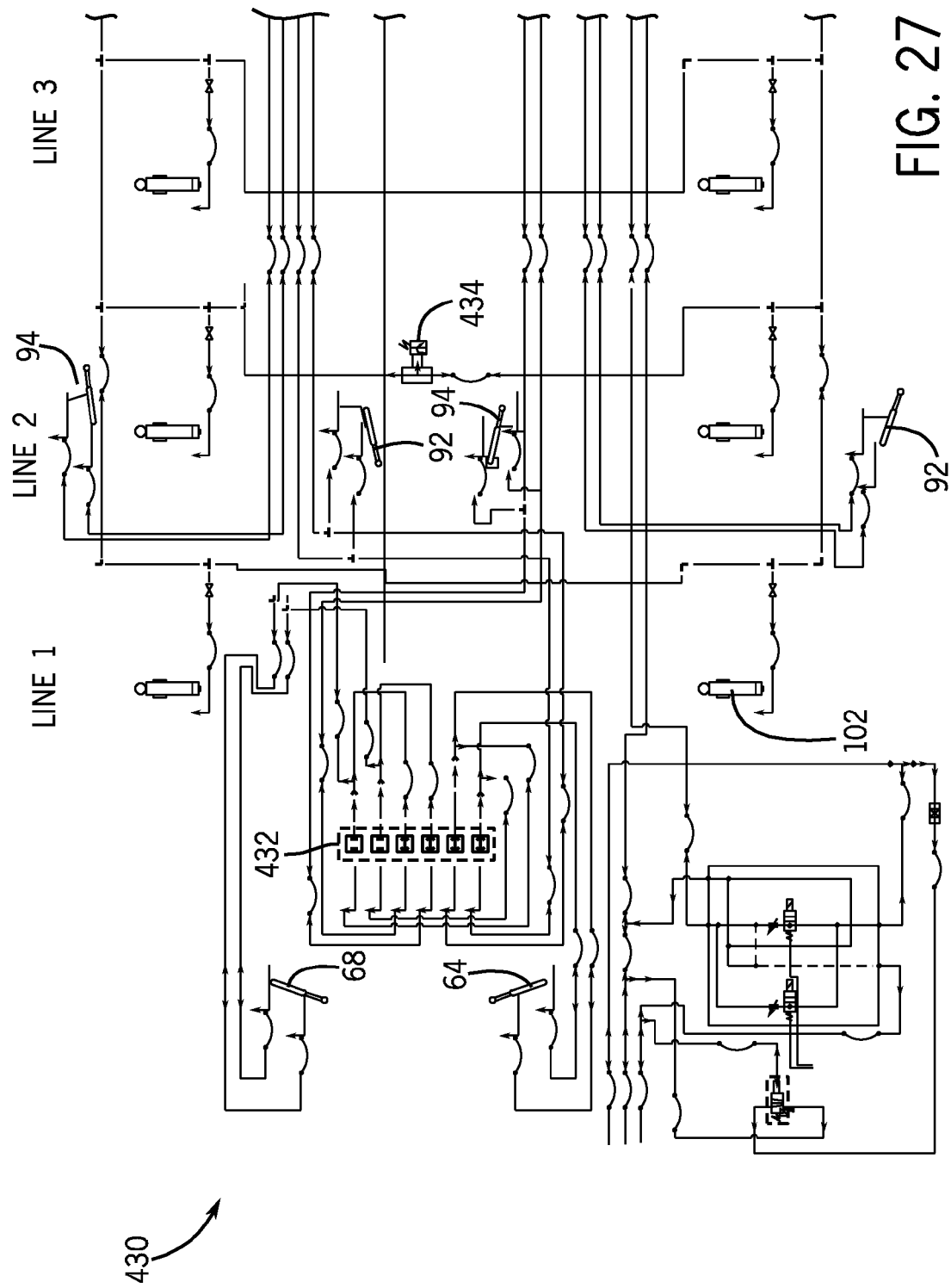
FIGS. 27-29 in combination is a schematic representation of the steering and suspension system for the trailer of the present invention.
Figure 28:
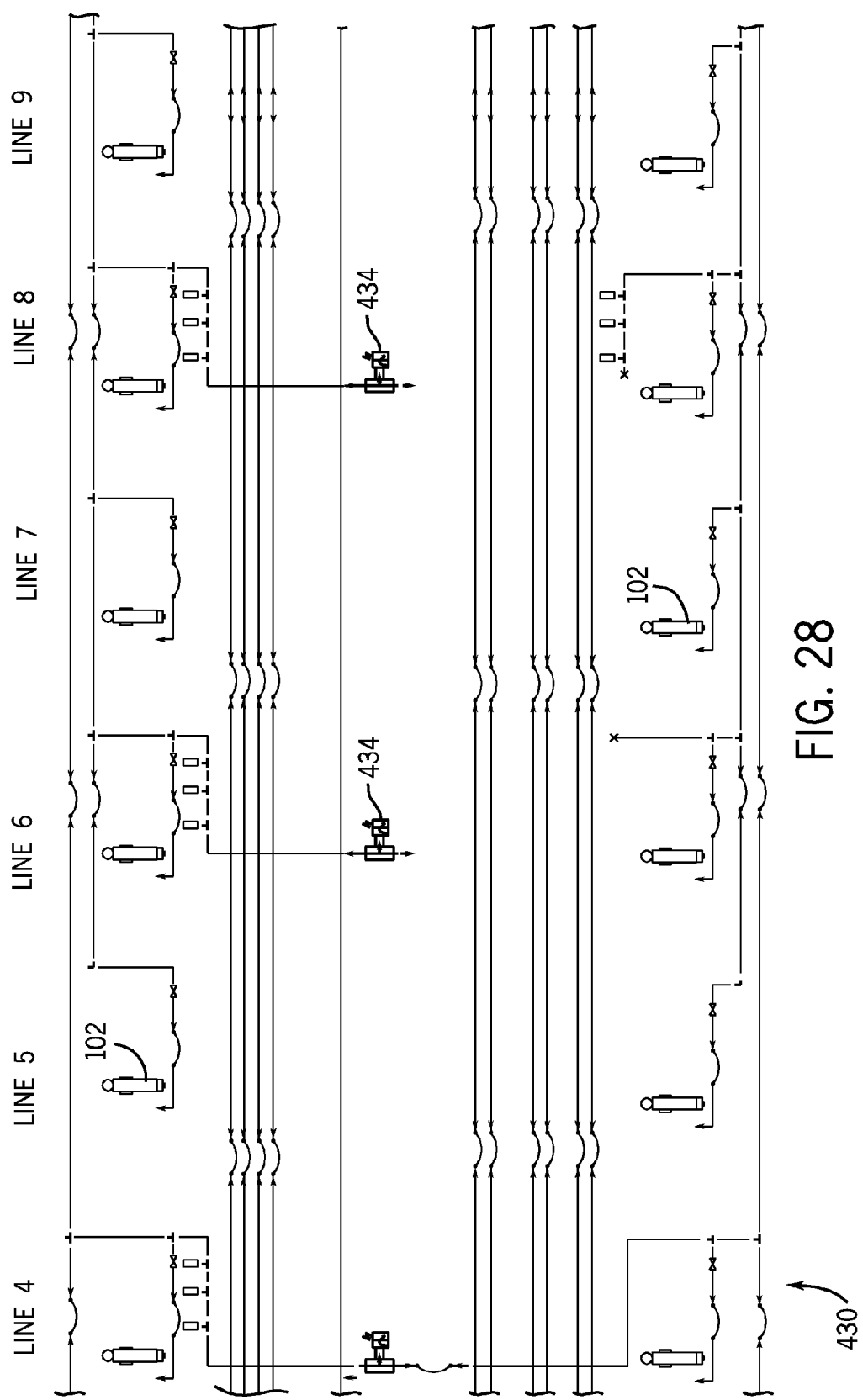
Figure 29:
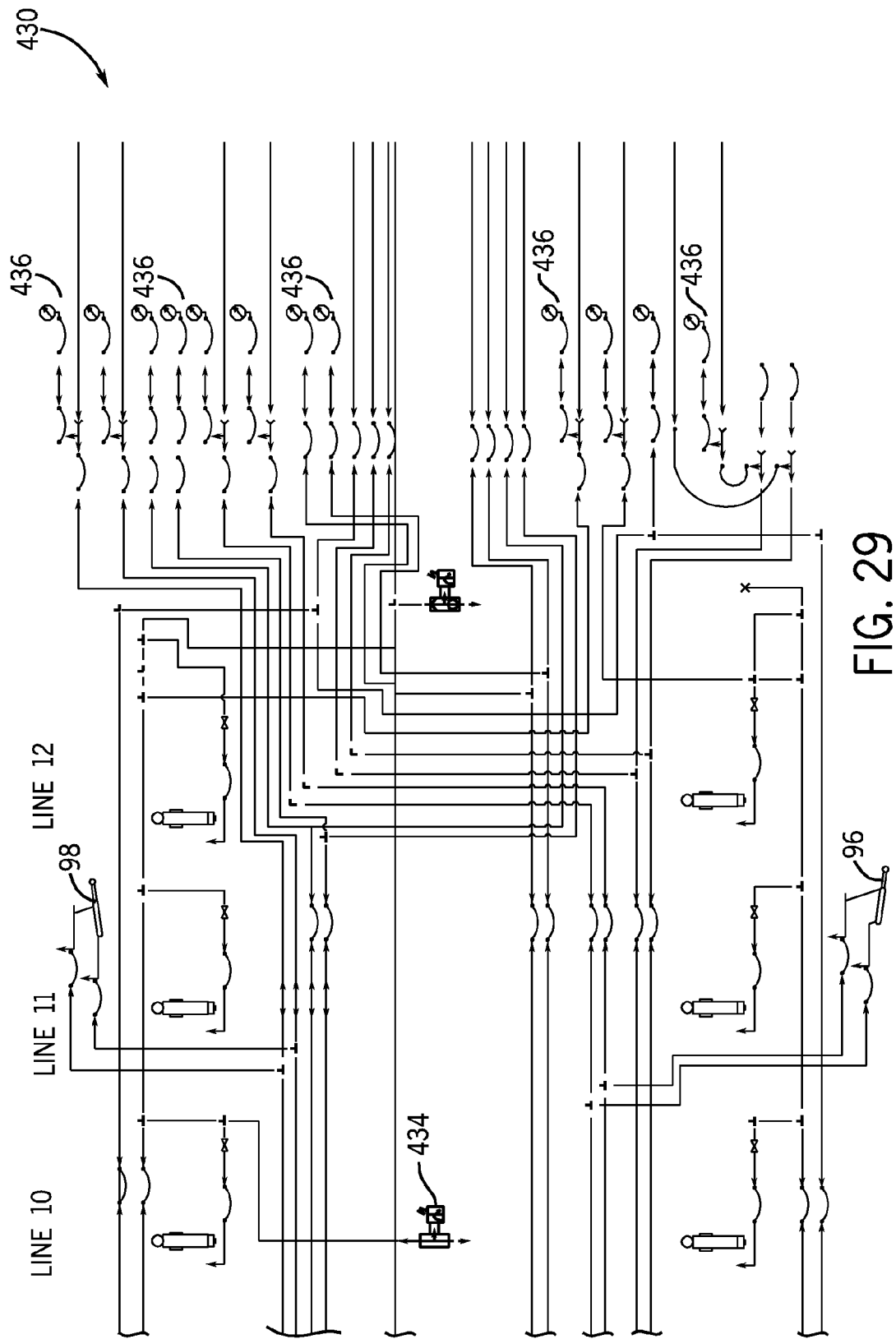
Figure 30:
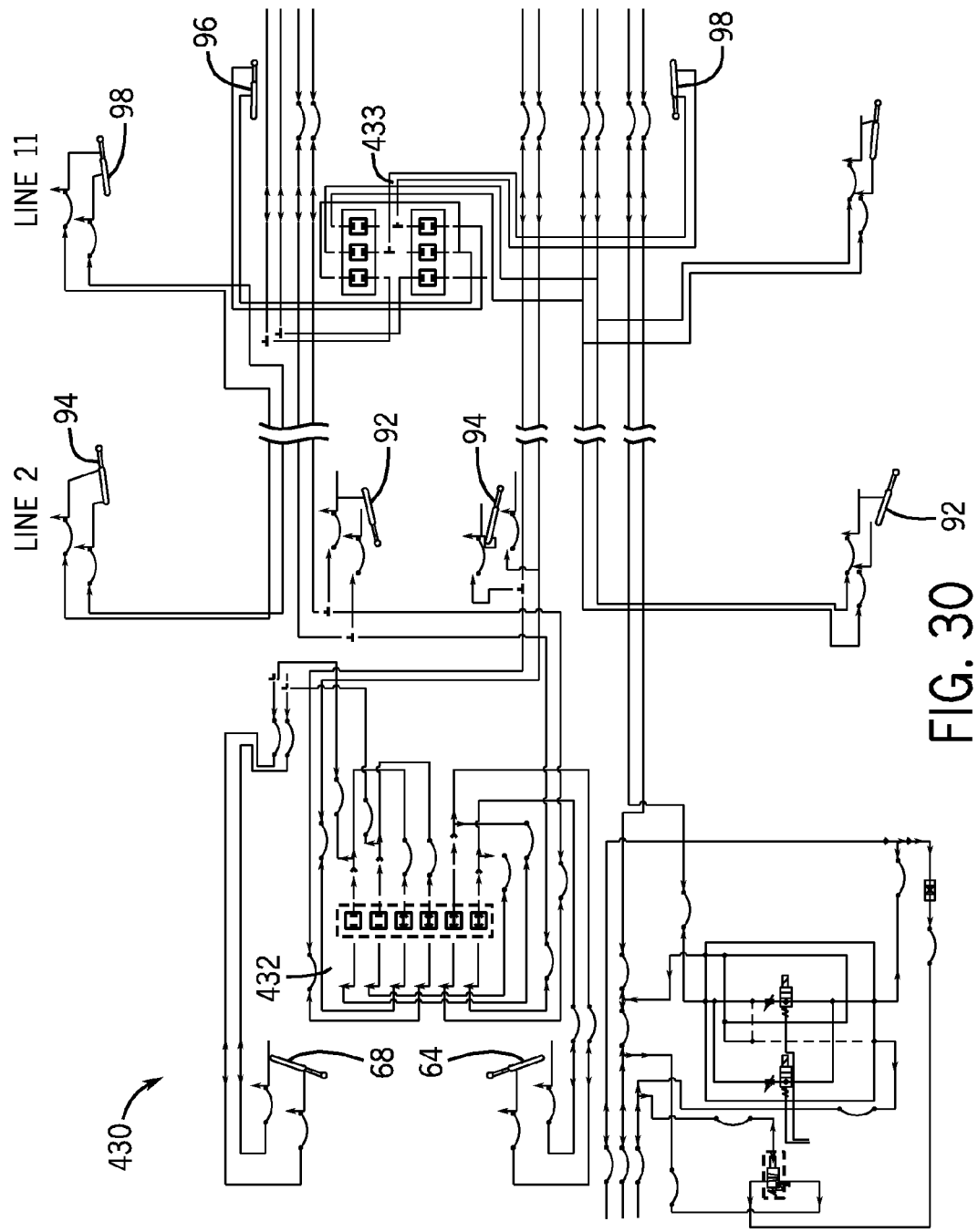
FIG. 30 is a schematic representation of an alternate embodiment of the steering and suspension system for the trailer of the present invention.

FIGS. 27-29 show a suitable steering and suspension schematic 430. Hydraulic manual and automatic switching valves 432 are coupled in line to the hydraulic fluid lines that supply hydraulic fluid to the hydraulic swivel cylinders 64 and 68, front steer cylinders 92 and 94, rear steer cylinders 96 and 98, and suspension lift hydraulic cylinders 102. Each pair of axle lines includes a fluid pressure sensor 434 and hydraulic gauges 436 that are coupled in line with the hydraulic control boxes 300 and 350 (the coupling is not illustrated in FIG. 29). In an alternate configuration shown in FIG. 30, an additional hydraulic manual and automatic switching valve 433 is coupled in line to the rear steer reduction cylinders and round steer slave cylinders 96 and 98.

An operator or user handheld control module 146 includes a processor and programming to allow the user to access a menu 450 (illustrated in FIG. 31) of options and to affect steering 452 by actuating the steer cylinders, raising and lowering the suspension 454, raising and lowering suspension cylinders 456 and 458, actuating additional function 460 and actuating rear steering alignment 462.

Figure 32:
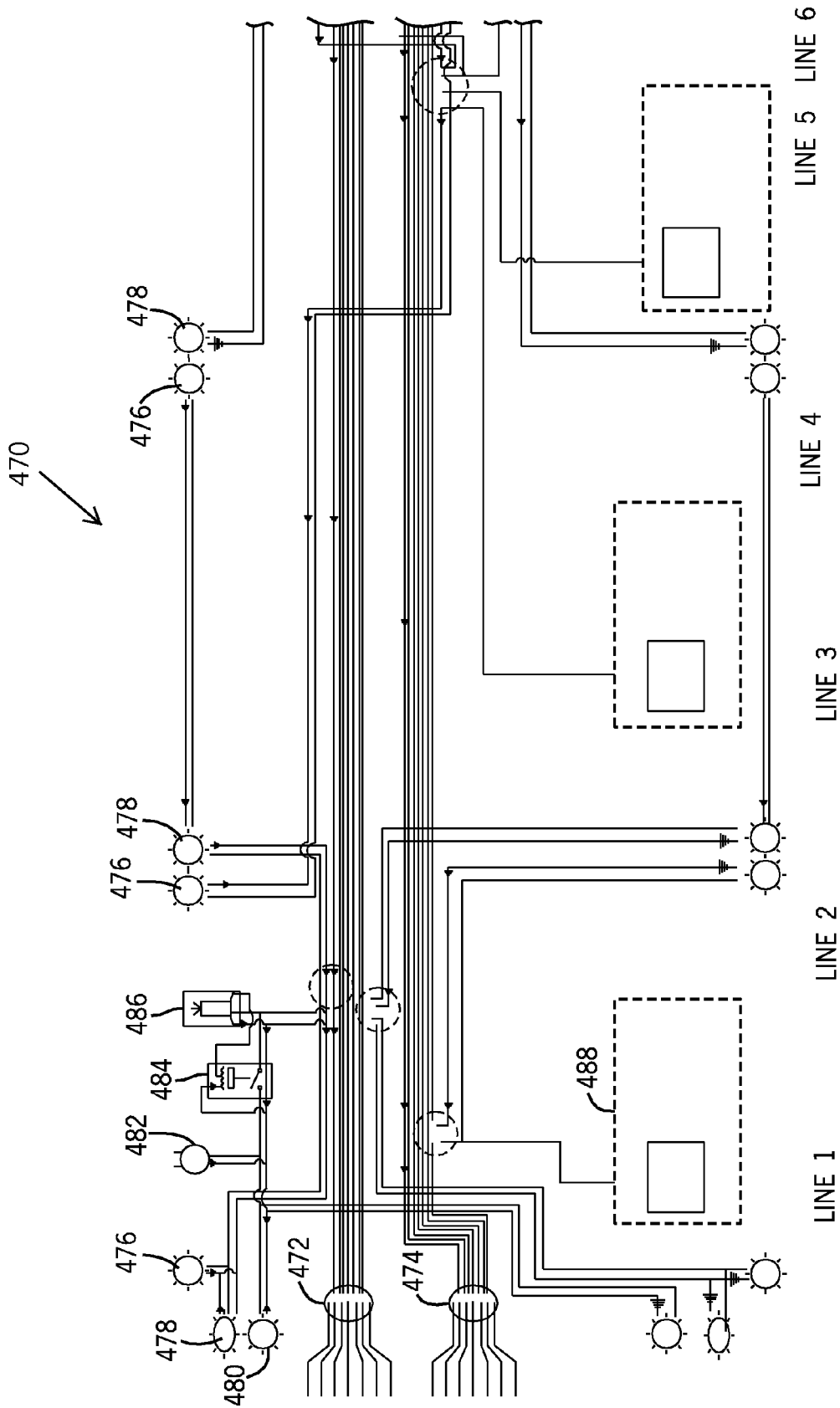
FIGS. 32-34 in combination is a schematic representation of the electrical wiring for the trailer of the present invention.
Figure 33:
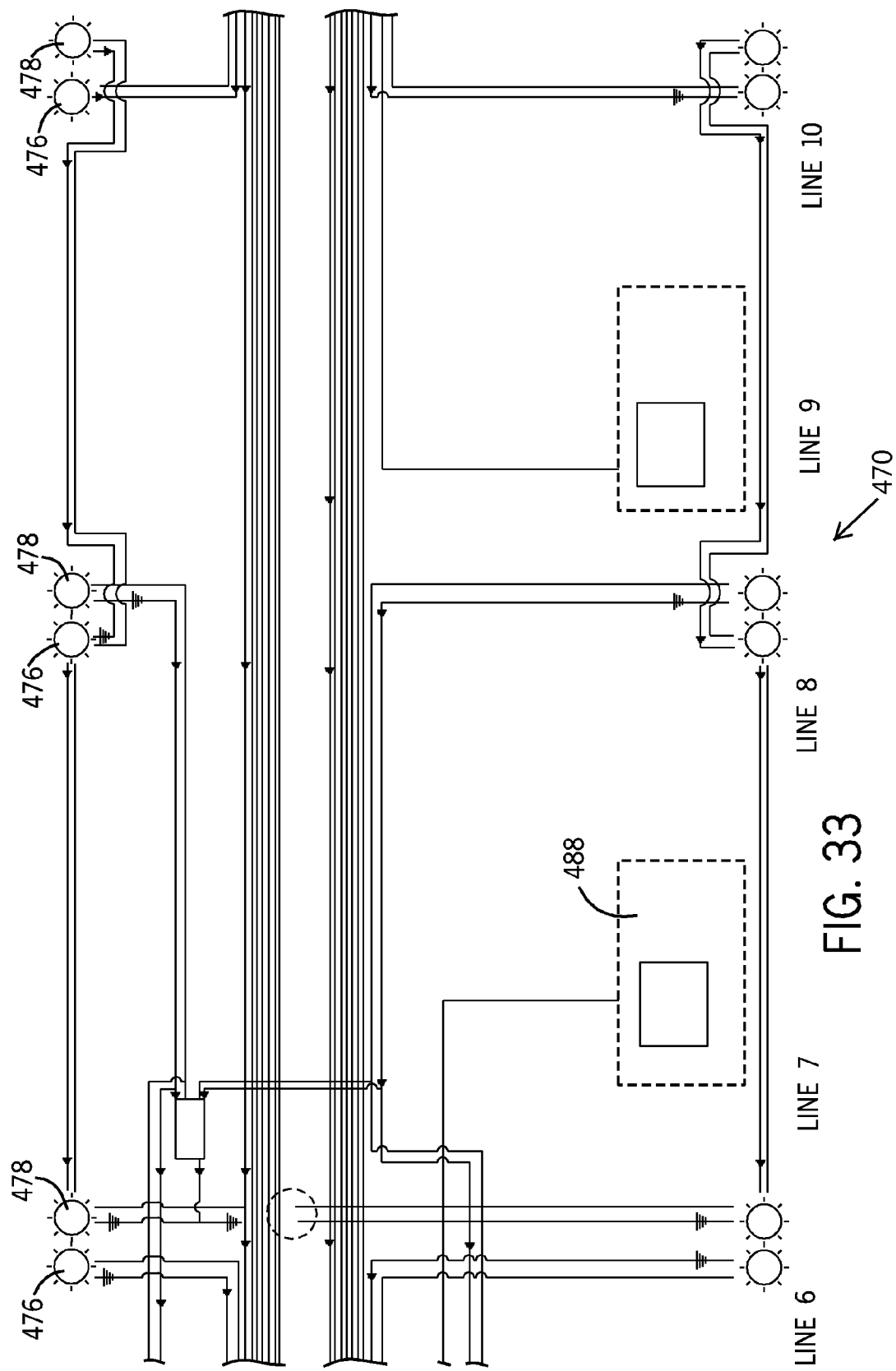
Figure 34:
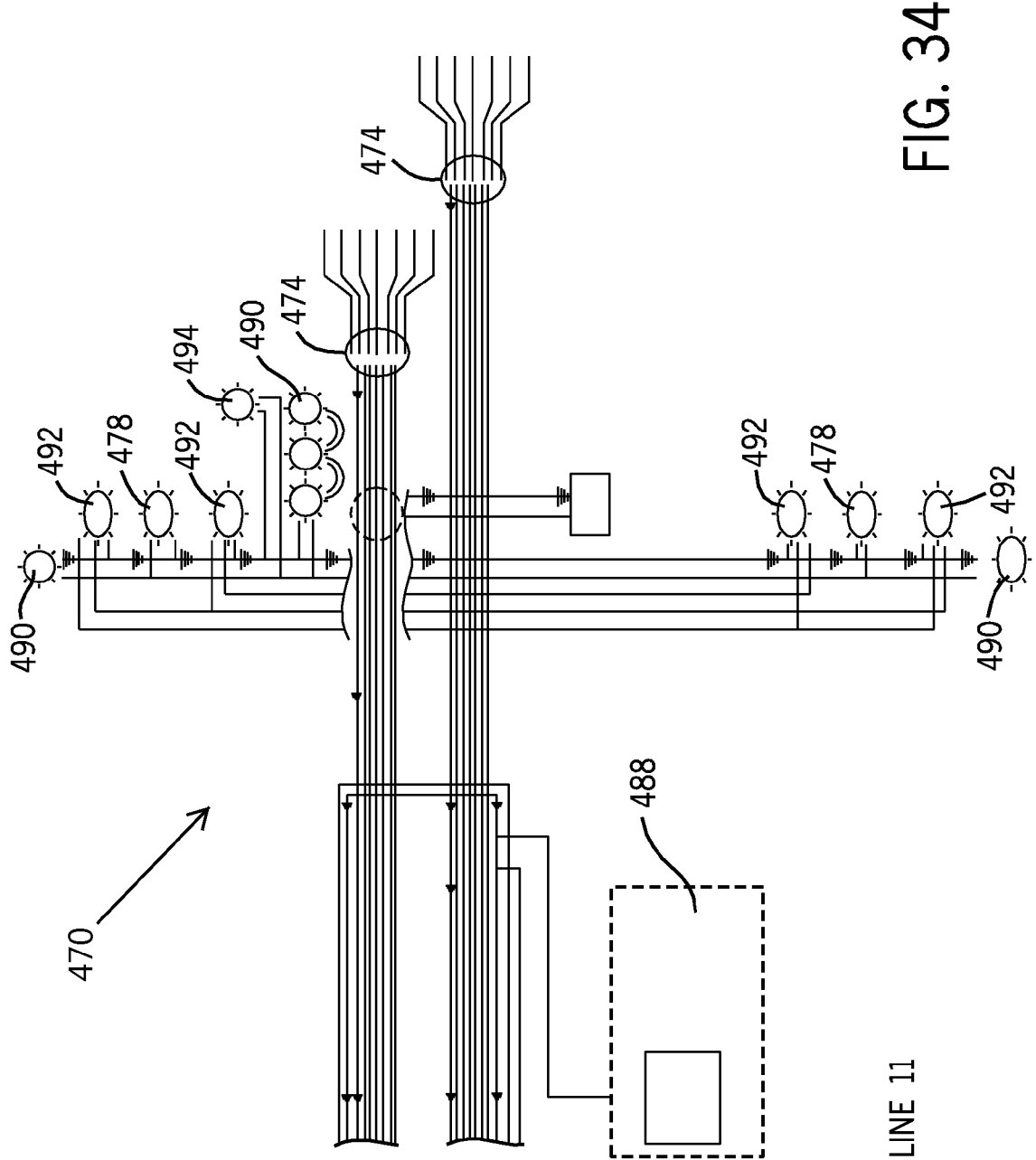

FIGS. 32-34 illustrates a suitable trailer light electrical wiring schematic 470. The front of the trailer wiring includes a 7-pin electrical trailer harness connector and a 7-pin auxiliary electrical trailer harness connector of suitable known construction. A horn 482, license plate marker 494, relay 484 and over steer sensor 486 are coupled in series and electronic control units (ECU's) are coupled to corresponding pairs of axle lines. A desired number of amber markers 476, amber strobes 478, red limit lights 480, red marker lights 490 and red brake lights 492 are further wired into the trailer lights wiring system.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A trailer system capable of on and off highway travel comprising:
   a carriage assembly;
   at least four axle lines coupled to said carriage assembly, each axle line having an axle set wherein each axle set includes two axles and each axle of said axle set includes two hubs and a single tire assembly coupled to each hub;
   a steering system to actuate tire assemblies of at least two axle lines at angles independent of other axle lines, wherein an amount of actuation of the steering system depends upon a relative speed of the trailer system;
   a suspension system having a suspension assembly coupled to each tire assembly wherein each suspension assembly has an independent compression rate; and
   a braking system coupled to each tire assembly that restricts rotation of the tire assembly by utilizing air, antilock, and electronic systems.

2. The trailer system as recited in claim 1 wherein said suspension system is self-leveling.

3. The trailer system as recited in claim 1 further including a first linkage that links a first and second axle line and a second linkage that links a third and fourth axle line wherein said first and second axle lines steer in a direction opposing a steer direction of said third and fourth axle lines.

4. The trailer system as recited in claim 3 wherein said suspension system of the first and second axle lines actuate up and towards a rear of said trailer and the third and fourth axle lines actuate up and toward a front of said trailer.

5. The trailer system as recited in claim 1 further including:
   a towbar having a tongue having a first end adapted to couple to a vehicle and a second end adapted to couple to the carriage;
   a hydraulic cylinder having a first end coupled to said tongue and a second end adapted for coupling to the carriage;
   a first accumulator pressurized with a gas in fluid communication with said hydraulic cylinder; and
   a second accumulator pressurized with a gas in fluid communication with said hydraulic cylinder.

6. The trailer system as recited in claim 5, further including gas ports coupled to said accumulators to increase or decrease the amount of gas in said accumulators.

7. The trailer system as recited in claim 5 wherein a gas pressure within said first accumulator is greater than a gas pressure within said second accumulator.

8. The trailer system as recited in claim 5 wherein said first and second accumulators are coupled in series to said hydraulic cylinder.

9. A trailer system capable of on and off highway travel comprising:
   a carriage assembly;
   at least four axle lines coupled to said carriage assembly, each said axle line having axles wherein each axle of each said axle line has two hubs and a single tire assembly coupled to each hub;
   a steering system to actuate tire assemblies of each axle line at angles independent of tire assemblies of other axle lines, wherein actuation of the steering system is dependent upon a relative speed of the trailer system;
   a suspension system having a suspension assembly coupled to each tire assembly wherein each suspension assembly has an independent compression rate;
   a braking system coupled to each tire assembly that restricts rotation of the tire assembly; and
   a towbar having a tongue having a first end adapted to couple to a vehicle and a second end adapted to couple to the carriage;
   a hydraulic cylinder having a first end coupled to said tongue and a second end adapted for coupling to the carriage;
   a first accumulator pressurized with a gas in fluid communication with said hydraulic cylinder; and
   a second accumulator pressurized with a gas in fluid communication with said hydraulic cylinder.

10. The trailer system as recited in claim 9 wherein said suspension system is self-leveling.

11. The trailer system as recited in claim 10 wherein a gas pressure within said first accumulator is greater than a gas pressure within said second accumulator.

12. The trailer system as recited in claim 9 further including a first linkage that links a first and second axle line and a second linkage that links a third and fourth axle line wherein said first and second axle lines steer in a direction opposing a steer direction of said third and fourth axle lines.

13. The trailer system as recited in claim 12 wherein said first and second accumulators are coupled in series to said hydraulic cylinder.

14. The trailer system as recited in claim 9, further including gas ports coupled to said accumulators to increase or decrease the amount of gas in said accumulators.

15. The trailer system as recited in claim 9 further including a swivel coupled between said tow bar and said carriage assembly.

16. A trailer system capable of on and off highway travel comprising:
   a carriage assembly;
   four axle lines coupled to said carriage assembly, each axle line of said four axle lines having an axle set wherein each axle set includes two axles and each axle of said axle set includes two hubs and a single tire assembly coupled to each hub;
   a steering system to actuate the tire assemblies of two of the four axle lines independent of an orientation of tire assemblies of a remaining axle lines of the four axle lines, wherein an amount of actuation of the steering system depends upon a relative speed of the trailer system;
   a self-leveling suspension system having a suspension assembly coupled to each tire assembly wherein each suspension assembly has an independent compression rate;

a braking system coupled to each tire assembly that restricts rotation of the tire assembly by utilizing air, antilock, and electronic systems; and a first linkage that links a first and second axle line and a second linkage that links a third and fourth axle line wherein said steering system steers said first and second axle lines in a direction opposing a steer direction of said third and fourth axle lines.

17. The trailer system as recited in claim 16 further including:

a towbar having a tongue having a first end adapted to couple to a vehicle and a second end adapted to couple to the carriage;

a hydraulic cylinder having a first end coupled to said tongue and a second end adapted for coupling to the carriage;

a first accumulator pressurized with a gas in fluid communication with said hydraulic cylinder; and a second accumulator pressurized with a gas in fluid communication with said hydraulic cylinder.

18. The trailer system as recited in claim 17, further including gas ports coupled to said accumulators to increase or decrease the amount of gas in said accumulators.

19. The trailer system as recited in claim 17 wherein a gas pressure within said first accumulator is greater than a gas pressure within said second accumulator.

20. The trailer system as recited in claim 17 wherein said first and second accumulators are coupled in series to said hydraulic cylinder.

\* \* \* \* \*